United States Patent [19]

Tanaka

[11] Patent Number: 5,307,443

[45] Date of Patent: Apr. 26, 1994

[54] APPARATUS FOR PROCESSING INFORMATION BASED ON FUZZY LOGIC

[76] Inventor: Masato Tanaka, 1-24-1-132, Seya, Seya-ku, Yokohama-City Kanagawa, Japan

[21] Appl. No.: 775,123

[22] Filed: Oct. 11, 1991

[51] Int. Cl.$^5$ ............................................. G06F 15/18
[52] U.S. Cl. ........................................ 395/3; 395/900
[58] Field of Search ..................... 395/900, 3, 61, 51

[56] References Cited

U.S. PATENT DOCUMENTS 4,837,725  6/1989  Yamakawa ............................... 395/3

OTHER PUBLICATIONS

Giles, "The Concept of Grade of Membership," Fuzzy Sets and Systems 25 (1985) 297–323.
Chiu et al, "Real Time Fuzzy Control: From Linguistic Rules to Implementation on a Chip," Methodologies for Intelligent Systems, Proc. of Inter. Sym. 14–17 Oct. 1987, pp. 17–24.

Primary Examiner—Allen R. MacDonald
Attorney, Agent, or Firm—Waldron & Associates

[57] ABSTRACT

An apparatus for processing fuzzy information based on a membership function defining a fuzzy set, which generates the membership function with an elliptic, parabolic or rectangular, shape of equi-grade contour plane or line, incorporates the membership function at any position in a multi-dimensional space with a plurality of input variables and grade of compatibility as coordinates, and calculates and outputs a value of the grade of compatibility with respect to the incorporated membership function for given input variables.

5 Claims, 21 Drawing Sheets $t = G(X, Y, Z)$ (1) $S = S_K (= R_y / d_y)$ (2) $0 < S < S_K$ (3) $S = 0$

APPARATUS FOR PROCESSING INFORMATION BASED ON FUZZY LOGIC

BACKGROUND OF THE INVENTION

1. Field of the Invention

The present invention relates to an apparatus for processing &uzzy information based on fuzzy logic.

2. Description of the Prior Art

In conventional fuzzy information processing, membership functions are represented in two-dimensional space, one axis of which is input variable x and the other is its grade of compatibility or degree t of membership with respect to a fuzzy set. Therefore the method, in case of processing more than two input variables $x_1$, $x_2$, ..., derives the totally evaluated grade by the composition of all grades $t_1$, $t_2$, ..., each of which is obtained from a membership function defined on each input variable. We call this kind of membership function a "conventional type".

An example of the case in which two input variables exist is shown in FIGS. 1 and 2. For input variables x and y conventional type membership functions $M_x$ and $M_y$ are defined, and grades $t_x$ and $t_y$ of compatibility are obtained respectively. In the figures, each membership function is given as isosceles triangle, which is often used in a fuzzy control. According to fuzzy reasoning, values of the input variables x and y are evaluated by obtaining grades $t_x$ and $t_y$ by the membership functions $M_x$ and $M_y$ as antecedents of a fuzzy "if-then" rule. Applying composition operation, usually minimum operation, to $t_x$ and $t_y$, then the total grade of compatibility or membership value or grade of membership of the input is derived.

In general the resulting membership function for two or more input variables is constructed by composing all membership functions. The composed membership function defines a figure in space, axes of which are input variables and grade of compatability. In the case of above example, the figure is a quadrangular pyramid. And the intercept of the resulting membership function at a certain grade, that is a equigrade contour line, is interpreted as a boundary curve of a fuzzy set or a fuzzy region represented by the membership function. When fuzzy information processing is done by the conventional method, the boundary curve is limited to a particular shape depending on the composition operation. In the case of above example, it is always a rectangle in the two-dimensional plane of each input variable.

However, this limitation of boundary shape means that the shape of fuzzy set in space defined by the input variables is also limited. Therefore, the conventional multi-input system which processes fuzzy information cannot treat any fuzzy set without the predefined particular shape, characteristic of the composed membership function.

Thinking about the practical control field, a relationship between two variables are often represented by a distribution of points, of which coordinates are the values of input variables, in the two-dimensional plane of input variables. In general, it is difficult to determine the trend of distribution such as linearity or the direction of gradient, by using statistical methods. However, human judgment is rather useful to do these steps. Human judgment does not use the linear shape of distribution such as a rectangle, but extrapolates a curved shape such as a ellipse as' a clue. Fuzzy theory is thought to be able to make such judgments Therefore, it is desired that a fuzzy set which has an arbitrary boundary shape, such as an ellipse, could be incorporated into the space defined by input variables. By using the conventional method, such requirement is satisfied by approximation. That is, at first the region which is given by the above stated boundary is partitioned into smaller ones for each input variable. A conventional type membership function must be assigned to each region. Moreover, an appropriate value is assigned to the consequent of "if-then" type production rule.

However, such processing method has the following problems.

(1) It needs a great number of membership functions and rules.

(2) It is difficult to recognize the shape of partitioned regions.

(3) It can only approximately incorporate fuzzy sets with varying shapes of boundaries.

(4) The processing becomes very complex in the case where there is an overlapping of more than two regions of arbitrary shape.

Because of the above mentioned reasons, the conventional fuzzy information processing method could not incorporate a fuzzy set with unlimited shape of boundary.

SUMMARY OF THE INVENTION

It is an object of the present invention to provide an apparatus for processing fuzzy information, which can incorporate various fuzzy sets with arbitrary shapes of boundaries, i.e., membership functions.

It is another object of the present invention to provide an apparatus for processing fuzzy information, which can incorporate a membership function in the multidimensional space defined by multiple input variables.

It is a further object of the present invention to provide an apparatus for processing fuzzy information, which needs fewer parameters which can be readily organized, and which needs much less memory than the conventional systems of fuzzy information processing.

It is a further object of the present invention to provide an apparatus for processing fuzzy information, which is applicable to every fuzzy system, uncluding an adaptive fuzzy control system, and which displaces or transforms a fuzzy set according to the circumstances of operation.

According to a basic aspect of the present invention, there is provided an apparatus for processing fuzzy information based on membership functions representing a fuzzy set, which can calculate and output the grade of compatibility, or a membership function value, of multi-input values by the membership function having an arbitrary shape of equigrade contour line incorporated on the multi-dimensional space defined by the multiple input variables.

According to a basic aspect of the present invention, by using a continuous multi-dimensioned membership function for multiple input variables, a fuzzy set with arbitrary shape of boundary is not only able to be incorporated on the space defined by the multiple input variables, but also able to be easily moved in the defined space by changing parameters of the membership function.

Each of the embodiments of the present invention incorporates a membership function in the multi-dimensional space defined by multiple input variables, the boundary shape of which is an ellipse, a parabola or a rectilinear lozenge shape.

According to another aspect of the present invention, there is provided an apparatus for processing fuzzy information based on a membership function defining a fuzzy set, which calculates and outputs a value of grade of compatibility for the fuzzy set having an elliptic, parabolic or rectangular boundary in a multi-dimensional space with a plurality of input variables as coordinates, so that a membership function value, or a value of grade of compatibility of the whole set is obtained by using composition operation on the grades of compatibility for the fuzzy set with respect to each of a plurality of input variables.

According to another aspect of the present invention, there is provided an apparatus for processing fuzzy information based on a membership function defining a fuzzy set, which calculates and outputs a value of grade of compatibility of the whole set by using composition operation of the grades of compatibility for a fuzzy region, which is individually constructed by each of conventional type membership functions and fuzzy rules, having an elliptic, parabolic or rectangular boundary, when for every fuzzy variable, there is at least one fuzzy rule having a plurality of &uzzy variables and a value of the grade of compatibility with respect to the conventional type membership function incorporated in a plane with one input variable and grade of compatibility for the fuzzy set as coordinates.

According to another aspect of the present invention, there is provided an apparatus for generating multi-dimensional membership functions comprising:

a membership function memory for storing equations for multi-dimensional membership functions;

a membership function parameter memory for storing the individual multi-dimensional membership functions and the values of parameters thereof;

a system mode selecting means for generating a signal to select one of two system modes which are a mode of calculating grade of compatibility and a mode of writing or changing parameters for incorporating the membership function;

a parameter input means for inputting parameters for the multi-dimensional membership function when the mode of writing or changing parameters are selected by said system mode selecting means;

a membership function selecting means for giving a signal to select an equation or a set of parameters of the membership function memorized in said membership function memory and said membership function parameter memory, respectively, in each of said system modes selected by said system mode selecting means;

a calculation point specification means for giving coordinate values of specified point at which the grade of compatibility is calculated;

a system mode switching control means for controlling said parameter input means, said membership function selecting means and said calculation point specification means according to the signal from said system mode selecting means, so that said system mode switching control means activates said membership function selecting means and said calculation point specification means in the calculation mode, or it activates said parameter input means and said membership function selecting means in the parameter writing or changing mode;

a parameter writing execution means for executing process of writing values of parameter inputted by said parameter input means for the membership function selected by said membership function selecting means in the parameter writing mode;

a coordinate transformation execution means for executing calculation of coordinate values of the specified point transformed by parallel displacement, rotation or deformation in the calculation mode;

a grade calculation execution means for calculating grade of compatibility of the point inputted by said calculation point specification means and modified by said coordinate transformation execution means in the calculation mode; and a grade output means for outputting the resulting grade of compatibility calculated by said grade calculation execution means.

BRIEF DESCRIPTION OF THE DRAWINGS

DETAILED DESCRIPTION OF THE PREFERRED EMBODIMENTS (1) General expression of 3-dimensional membership function FIG. 3 shows the continuous membership function in the 3-dimensional space which consists of x-y orthogonal axis and grade of compatibility. Notations used in the figures are as follows.

For the simplicity, the fiducial or center point for constructing membership function is located at an origin of the coordinate system.

$F(x,y,R_x,R_y)$: a function which gives the shape of equi-grade contour line $t_x = f(x)$: a membership function in $x$-$t_x$ plane $t_y = g(y)$: a membership function in $y$-$t_y$ plane $R_x$: a value of x of a point (x,y) on the cross sectional equigrade contour line of arbitrary grade cut at $x$-$t_x$ plane, i.e., a parameter depending on fuzzy entropy with respect to x $R_y$: a value of y of a point (x,y) on the cross sectional equigrade contour line of arbitrary grade cut at $y$-$t_y$ plane, i.e., a parameter depending on fuzzy entropy with respect to y t: grade of compatibility of point (x,y) with respect to the desired membership function According to the above notations, the following equations hold:

$$t_x = f(x)$$

$$t_y = g(y)$$

$$t = f(R_x)$$

$$t = g(R_y)$$

Therefore, $$x = f^{-1}(t_x)$$

$$y = g^{-1}(t_y)$$

$$R_x = f^{-1}(t)$$

$$R_y = g^{-1}(t)$$

Then, from these equations, a relationship between x, y and t is derived as follows:

$$F\{x,y,f^{-1}(t),g^{-1}(t)\} = 0$$

And the composition rule of $t_x$ and $t_y$ are generally expressed as follows:

$$F\{f^{-1}(t_x),g^{-1}(t_y),f^{-1}(t),g^{-1}(t)\} = 0$$

If we can make the last two equations reform to the explicit functions of t, they may be expressed as $$t = G(x,y)$$

$$t = t_x \Diamond t_y = G'(t_x, t_y)$$

where diamond $\Diamond$ is a general symbol of composition rule, for example, it means algebraic multiplication.

(2) General expression of (n+1)-dimensional membership function

The idea of 3-dimensional membership function is extended to (n+1)-dimensional one.

If we suppose a function which gives the shape of n-dimensional equi-grade contour line as $$F(x_1,x_2,\ldots,x_n;R_1,R_2,\ldots,R_n) = 0$$

and conventional type membership functions for input variables as $$t_1 = f_1(x_1)$$
$$t_2 = f_2(x_2)$$
$$\vdots$$
$$t_n = f_n(x_n)$$

then $$t = f_1(R_1) = f_2(R_2) = \ldots f_n(R_n)$$

holds.

Therefore, the relationship between input variables $X_1, \ldots, x_n$ and t are derived as follows:

$$F\{x_1,x_2,\ldots,x_n;f_1^{-1}(t),f_2^{-1}(t),\ldots,f_n^{-1}(t)\} = 0$$

Moreover, a composition rule of $t_1, \ldots, t_n$ is $$F\{f_1^{-1}(t_1),f_2^{-1}(t_2),\ldots,f_n^{-1}(t_n);f_1^{-1}(t),f_2^{-1}(t),\ldots,f_n^{-1}(t)\} = 0.$$

If we can make these equations reform to the explicit functions of t, they may be expressed as $$t = G(x_1,x_2,\ldots,x_n)$$

$$t = \Diamond t_i = G'(t_1, t_2, \ldots, t_n)$$

(3) Displacement and transformation of 3-dimensional membership function

Changing parameters properly, a 3-dimensional membership function constructed in (1) can be easily moved by rotation or parallel displacement and transformed by angular change between x and y axis.

Figure 1:
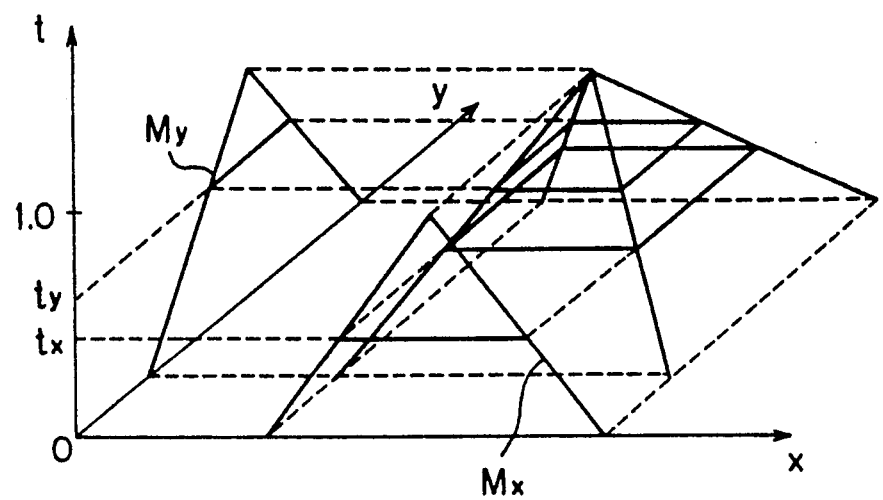
FIGS. 1 and 2 show the prior art continuous membership function in the 3-dimensional space.
Figure 2:
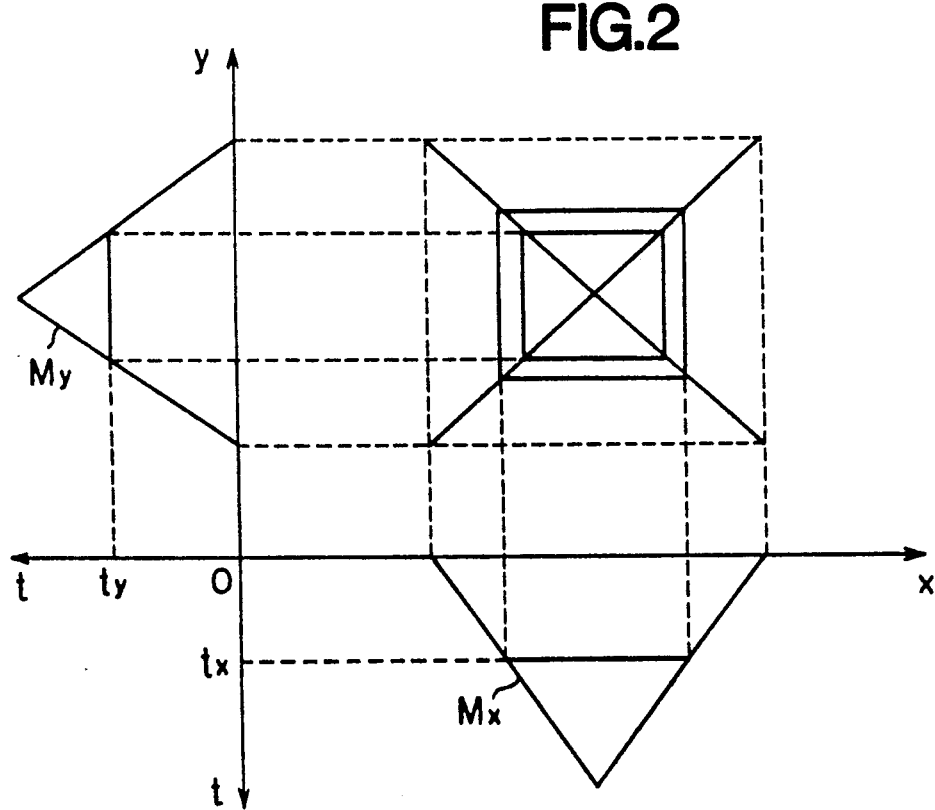
Figure 3:
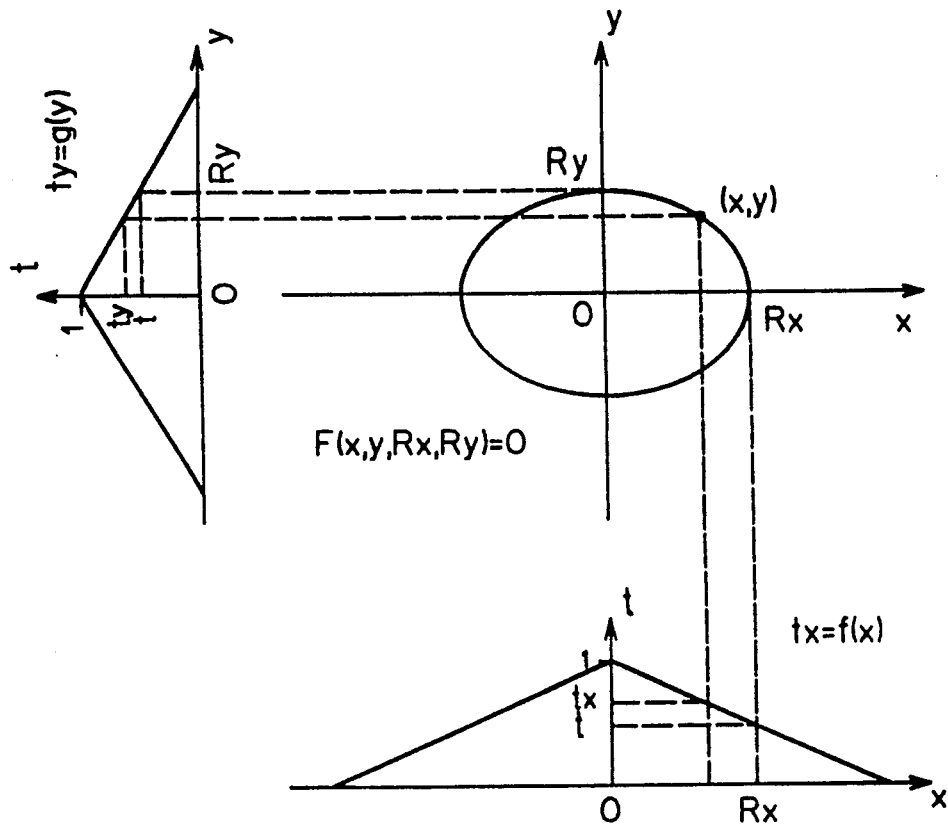
FIG. 3 shows an example of membership function in the 3-dimensional space which consists of x-y orthogonal axis and grade of compatibility according to the present invention.
Figure 4:
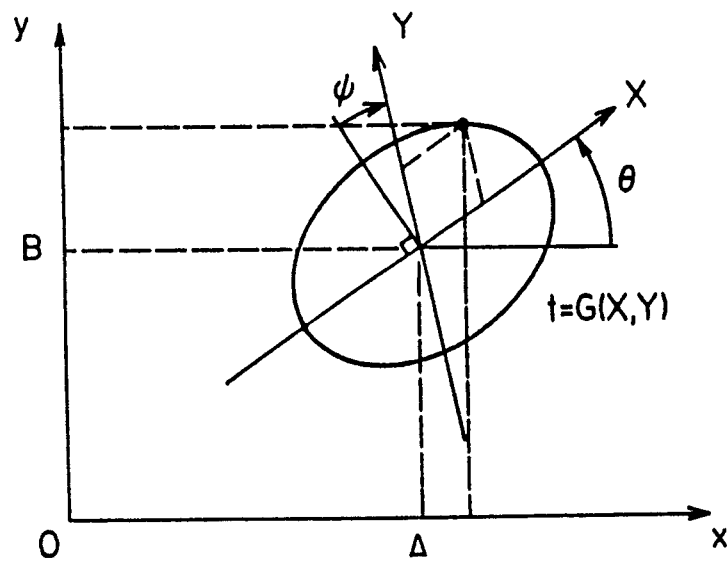
FIG. 4 shows an illustrative explanation of transformation.

FIG. 4 shows an illustrative explanation of these kind of transformation. In the figure a new coordinates axis X and Y are derived from the original ones x and y, at first by clockwisely rotating y-axis for angle $\psi$, and then by anticlockwise rotation of x and y axis for angle $\theta$, finally by moving the fiducial point from the origin to some point (A, B).

If a 3-dimensional membership function is given on the X-Y coordinate system as $$t = G(X, Y)$$

then the relationship between these two coordinate systems are given as the following matrix equation.

$$\begin{bmatrix} X \\ Y \\ 1 \end{bmatrix} = \begin{bmatrix} 1 & -\tan\psi & 0 \\ 0 & 1/\cos\psi & 0 \\ 0 & 0 & 1 \end{bmatrix} \begin{bmatrix} \cos\theta & \sin\theta & 0 \\ -\sin\theta & \cos\theta & 0 \\ 0 & 0 & 1 \end{bmatrix} \begin{bmatrix} 1 & 0 & -A \\ 0 & 1 & -B \\ 0 & 0 & 1 \end{bmatrix} \begin{bmatrix} x \\ y \\ 1 \end{bmatrix}$$

That is, $X = (x-A)\cos\theta + (y-B)\sin\theta - \{-(x-A)\sin\theta + (y-B)\cos\theta\}\tan\psi$ $Y = \{-(x-A)\sin\theta + (y-B)\cos\theta\} / \cos\psi$ Especially in the case of $\psi = 0$, i.e., X and Y are orthogonal, $t = G(X, Y)$ $X = (x-A)\cos\theta + (y-B)\sin\theta$ $Y = -(x-A)\sin\theta + (y-B)\cos\theta$ Furthermore, if $\theta = 0$, then $t = G(X, Y)$ $X = (x-A) / \cos\theta$ $Y = -(x-A)\tan\theta + (y-B)$ (4) Displacement of 4-dimensional membership function A 4-dimensional membership function in the space of x-y-z orthogonal coordinates and grade of compatibility is also easily moved by rotation or parallel displacement. For simplicity and brevity, angular change of any axis of the coordinate system is not discussed here. Such transforms are well known.

Figure 5A:
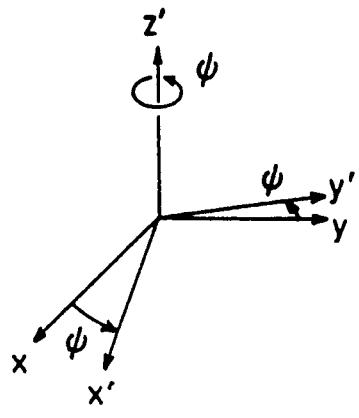
FIGS. 5a–5c show rotation of 4-dimensional membership function.
Figure 5B:
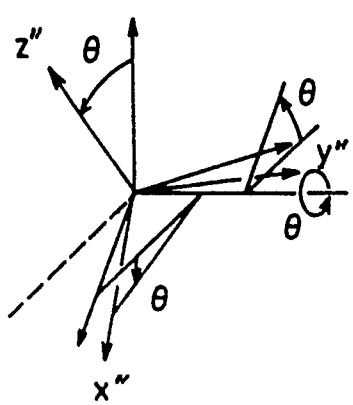
Figure 5C:
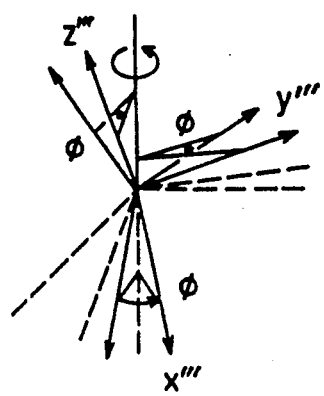
Figure 6:
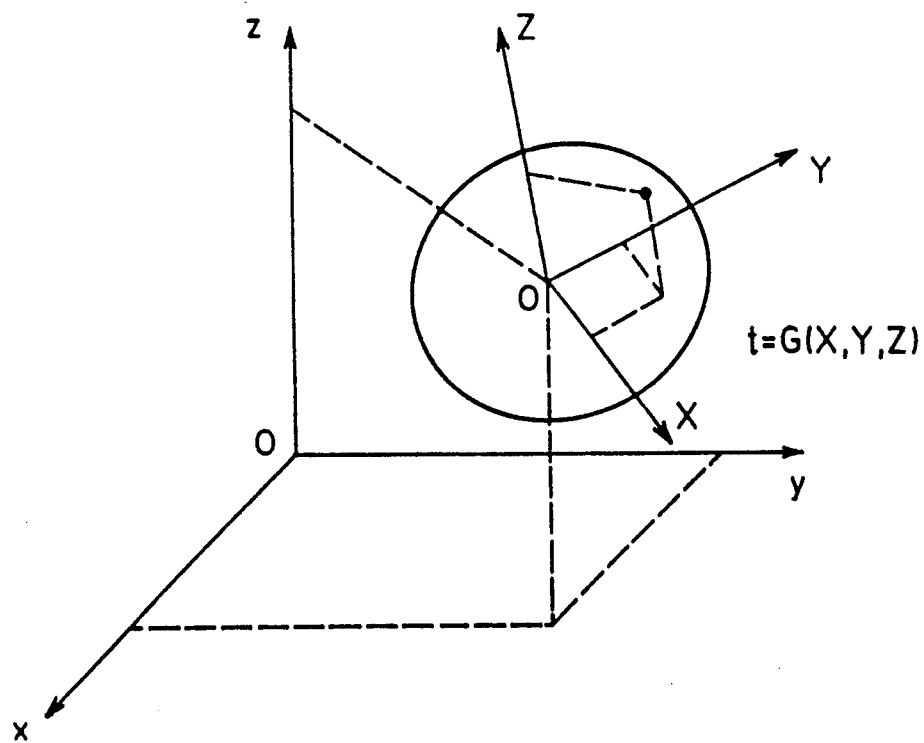
FIG. 6 shows displacement of the 4-dimensional membership function moved to desired position.

The rotation of membership function is expressed by Euler angles $\phi$, $\theta$ and $\psi$ shown in FIG. 5. If we suppose new coordinates X, Y and Z are derived from the original ones x, y and z by rotations of the angles $\phi$, $\theta$ and $\psi$ and parallel displacement of a specified point from an origin to a new point (A, B), then, as shown in FIG. 6, the relationship between these two coordinate systems is as follows:

$t = G(X, Y, Z)$ where $$\begin{bmatrix} X \\ Y \\ Z \\ 1 \end{bmatrix} = \begin{bmatrix} \cos\psi & \sin\psi & 0 & 0 \\ -\sin\psi & \cos\psi & 0 & 0 \\ 0 & 0 & 1 & 0 \\ 0 & 0 & 0 & 1 \end{bmatrix} \begin{bmatrix} \cos\theta & 0 & -\sin\theta & 0 \\ 0 & 1 & 0 & 0 \\ \sin\theta & 0 & \cos\theta & 0 \\ 0 & 0 & 0 & 1 \end{bmatrix} \times$$

$$\begin{bmatrix} \cos\phi & \sin\phi & 0 & 0 \\ -\sin\phi & \cos\phi & 0 & 0 \\ 0 & 0 & 1 & 0 \\ 0 & 0 & 0 & 1 \end{bmatrix} \begin{bmatrix} 1 & 0 & 0 & -A \\ 0 & 1 & 0 & -B \\ 0 & 0 & 1 & -C \\ 0 & 0 & 0 & 1 \end{bmatrix} \begin{bmatrix} x \\ y \\ z \\ 1 \end{bmatrix} =$$

$$\begin{bmatrix} P & Q & -\cos\psi\cdot\sin\theta & 0 \\ R & S & \sin\psi\cdot\sin\theta & 0 \\ \sin\theta\cdot\cos\phi & \sin\theta\cdot\sin\phi & \cos\theta & 0 \\ 0 & 0 & 0 & 1 \end{bmatrix} \begin{bmatrix} 1 & 0 & 0 & -A \\ 0 & 1 & 0 & -B \\ 0 & 0 & 1 & -C \\ 0 & 0 & 0 & 1 \end{bmatrix} \begin{bmatrix} x \\ y \\ z \\ 1 \end{bmatrix} =$$

$$\begin{bmatrix} (x-A)P + (y-B)Q - (z-C)\cos\psi\cdot\sin\theta \\ (x-A)R + (y-B)S + (z-C)\sin\psi\cdot\sin\theta \\ T \\ 1 \end{bmatrix}$$

where $P = \cos\psi\cos\theta\cos\phi - \sin\psi\sin\phi$ $Q = \cos\psi\cos\theta\sin\phi + \sin\psi\cos\phi$ $R = -\sin\psi\cos\theta\cos\phi - \cos\psi\sin\phi$ $S = -\sin\psi\cos\theta\sin\phi + \cos\psi\cos\phi$ $T = (x-A)\sin\theta\cdot\cos\phi + (y-B)\sin\theta\cdot\sin\phi + (z-C)\cos\theta$ Therefore, a displaced 4-dimensional membership function is given by the following equations:

$t = G(X, Y, Z)$ $X = (x-A)(\cos\psi\cos\theta\cos\phi - \sin\psi\sin\phi) + (y-B)(\cos\psi\cos\theta\sin\phi + \sin\psi\cos\phi) - (z-C)\cos\psi\sin\theta$ $Y = -(x-A)(\sin\psi\cos\theta\cos\phi + \cos\psi\sin\phi) - (y-B)(\sin\psi\cos\theta\sin\phi - \cos\psi\cos\phi) + (z-C)\sin\psi\sin\theta$ $Z = (x-A)\sin\theta\cos\phi + (y-B)\sin\theta\sin\phi + (z-C)\cos\theta$ Next, elliptic, parabolic and rhombic membership functions are explained below as examples of the membership function used in the present invention.

I. Elliptic membership function

At first, a multi-dimensional elliptic membership function is explained.

Figure 7:
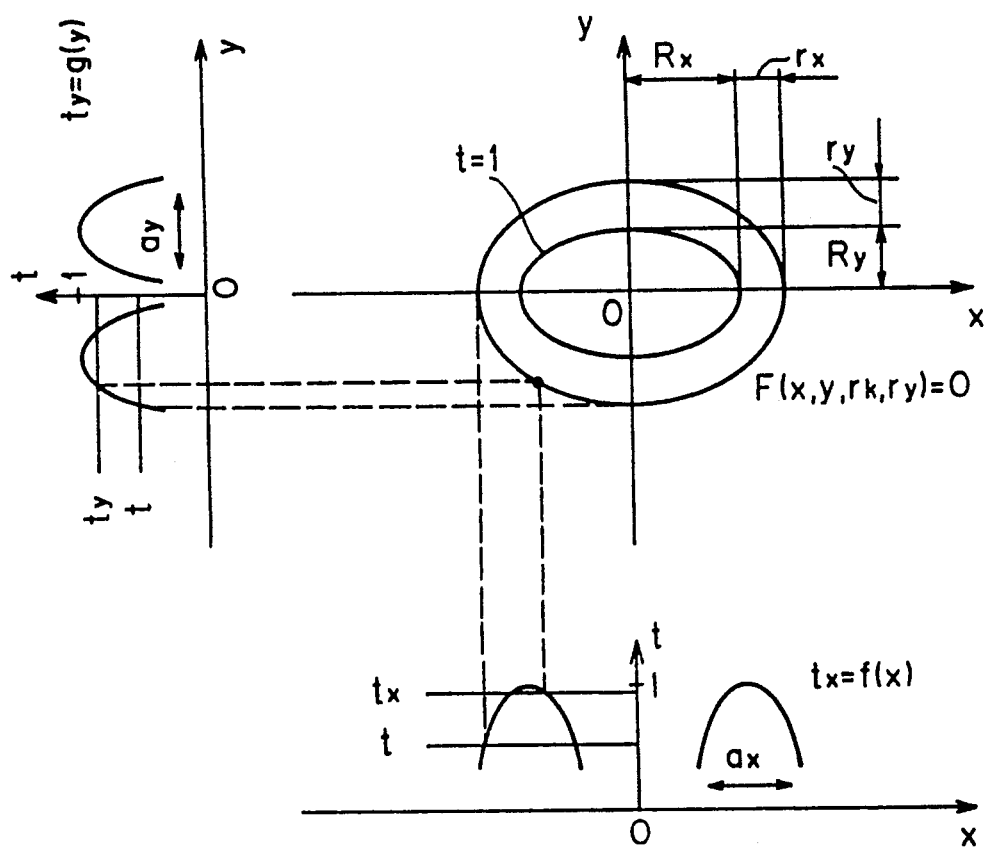
FIG. 7 shows an example of 3-dimensional elliptic membership function used in the present invention.

(1.1) Bell-like shape membership function:

FIG. 7 shows the membership function with an elliptic equi-grade contour line in the 3-dimensional space which consists of x-y orthogonal axis and degree of compatibility. Notations used in the figure are as follows.

For the simplicity, the fiducial or the center point for constructing membership function is located at the origin of the coordinate system.

$F(x,y,r_x,r_y)$: a function which gives the elliptic shape of equigrade contour line $t_x = f(x)$: a bell-like shape membership function in x-tx plane $t_y = g(y)$: a bell-like shape membership function in y-ty plane $R_x$: x-directional radius of elliptic equi-grade contour line at grade 1

$R_y$: y-directional radius of elliptic equi-grade contour line at grade 1

$a_x$: a parameter of $f(x)$ which is proportional to fuzzy entropy with respect to x $a_y$: a parameter of $g(y)$ which is proportional to fuzzy entropy with respect to y $r_x$: a distance between euqi-grade contour line of grade 1 and that of arbitrary grade on x-tx plane $r_y$: a distance between equi-grade contour line of grade 1 and that of arbitrary grade on y-ty plane t: grade of compatibility of point (x,y) with respect to the desired membership function Where $t_x$, $t_y$ and t are the same axis, but for convenience they are separately used.

According to the above notations, an equi-grade contour line including some point (x,y) is expressed as follows.

$$\frac{x^2}{(R_x + r_x)^2} + \frac{y^2}{(R_y + r_y)^2} - 1 = 0$$

The membership functions f(x) and g(y) are $$t_x = f(x) = \exp\left[-\frac{(x \mp R_x)^2}{a_x^2}\right]$$

$$t_y = g(y) = \exp\left[-\frac{(y \mp R_y)^2}{a_y^2}\right]$$

where the double sign is "minus" for positive values of x and/or y, respectively, and "plus" for negative values of x and/or y.

A distance between an arbitrary equi-grade contour line and the fiducial point on x-$t_x$ plane is $R_x + r_x$, and that on y-$t_y$ plane is $R_y + r_y$. Namely, $$t = \exp\left[-\frac{\{\pm(R_x + r_x) \mp R_x\}^2}{a_x^2}\right] = \exp\left[-\frac{r_x^2}{a_x^2}\right] \quad (1\text{-}5)$$

$$\therefore r_x = a_x\sqrt{-\ln t}$$

and $$t = \exp\left[-\frac{\{\mp(R_y + r_y) \mp R_y\}^2}{a_y^2}\right] = \exp\left[-\frac{r_y^2}{a_y^2}\right]$$

$$\therefore r_y = a_y\sqrt{-\ln t}$$

Then, from these equations, followings must be satisfied.

$$\frac{x^2}{(R_x + a_x\sqrt{-\ln t})^2} + \frac{y^2}{(R_y + a_y\sqrt{-\ln t})^2} - 1 = 0$$

$$\therefore \frac{x^2/a_x^2}{(R_x/a_x + \sqrt{-\ln t})^2} + \frac{y^2/a_y^2}{(R_y/a_y + \sqrt{-\ln t})^2} - 1 = 0$$

To make the last equation reform to the explicit function of "t", denominators of the first and the second term must be the same. At first, we obtain a minimum value $s_k$ as follows.

$$\min(R_x/a_x, R_y/a_y) = s_k$$

Then, for arbitrary value "s" such as $0 < s < s_k$, $d_x$ and $d_y$ are calculated to satisfy $$\frac{R_x - d_x}{a_x} = \frac{R_y - d_y}{a_y} = s$$

That is, obtaining $d_x$ and $d_y$ by following equations, $$d_x = R_x - a_x s$$

$$d_y = R_y - a_y s$$

the function of equi-grade line is reformed as follows, $$\frac{(x \mp d_x)^2/a_x^2}{\{(R_x - d_x)/a_x + \sqrt{-\ln t}\}^2} +$$

$$\frac{(y \mp d_y)^2/a_y^2}{\{(R_y - d_y)/a_y + \sqrt{-\ln t}\}^2} - 1 = 0$$

where "−" of the double sign corresponds to the positive value of x or y, and "+" corresponds to the negative value. Therefore, $$\therefore \frac{(|x| - d_x)^2/a_x^2}{(s + \sqrt{-\ln t})^2} + \frac{(|y| - d_y)^2/a_y^2}{(s + \sqrt{-\ln t})^2} - 1 = 0$$

holds.

Figure 8A:
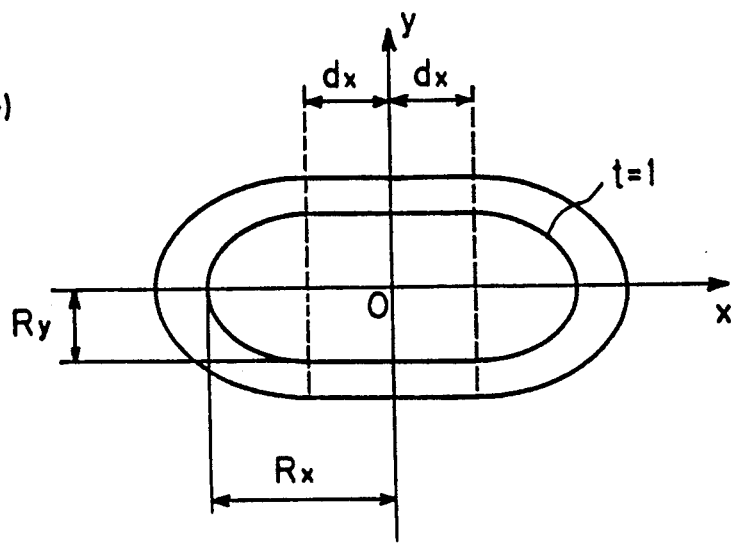
FIGS. 8a–8c show shaped which consist of ellipsoid and additional linear part.
Figure 8B:
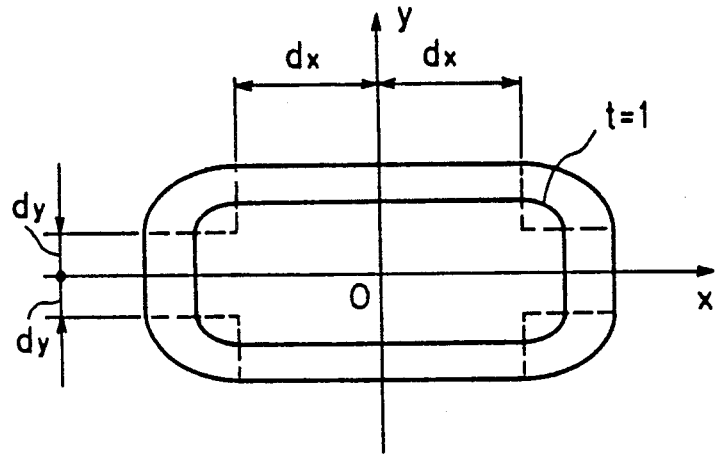
Figure 8C:
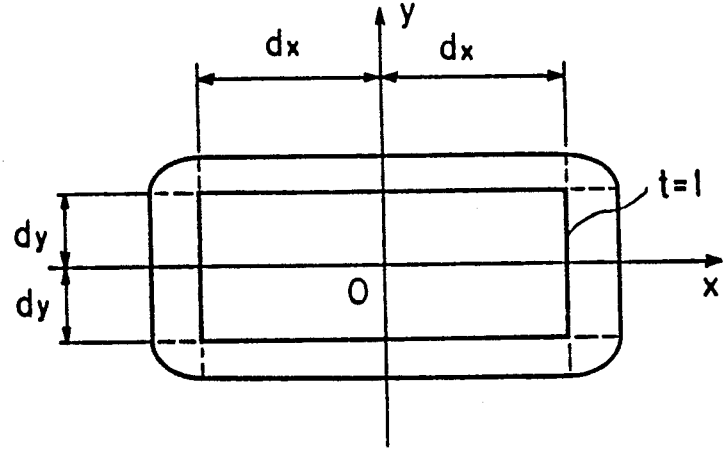

The geometrical meaning of the last equation is illustratively shown by FIG. 8. That is, the equigrade contour line given by the equation has an elliptic shape with some straight line added. From the last equation we get $$s + \sqrt{-\ln t} = \sqrt{\frac{(|x| - d_x)^2}{a_x^2} + \frac{(|y| - d_y)^2}{a_y^2}}$$

$$\because s + \sqrt{-\ln t} > 0$$

$$\therefore t = \exp\left[-\left\{\sqrt{\frac{(|x| - d_x)^2}{a_x^2} + \frac{(|y| - d_y)^2}{a_y^2}} - s\right\}^2\right]$$

In the calculation of t we set x=$d_x$ for $|x|<d_x$ and y=$d_y$ for $|y|<d_y$. And in the case that the chosen equi-grade contour line exists at the outside of that of grade 1, the value of braces of the equation is positive.

By reforming, the same equation is derived in the case that such contour line exists at the inside of that of grade 1. In that case, the value of braces is positive for the point (x,y) laying on the straight part of contour line, and is negative for the point laying on the elliptic part.

When the inside (outside) region of the contour line of grade 1 is uniformly grade 1, the value of t is determined according to the above conditions.

When we use conventional type membership functions to be composed on the elliptic equi-grade contour line, the same effect is expected as the method using the elliptic membership function proposed here. The method of composition is as follows:

In the region outside the contour line of grade 1, the grade of compatibility of x and that of y are given by the following equations respectively.

$$t_x = \exp\left[-\frac{(x \mp R_x)^2}{a_x^2}\right] =$$

$$\exp\left[-\frac{\{(x \mp d_x) \mp (R_x - d_x)\}^2}{a_x^2}\right] =$$

$$\exp\left[-\left(s - \frac{|x| - d_x}{a_x}\right)^2\right]$$

-continued $$\therefore s + \sqrt{-\ln t_x} = \frac{|x| - d_x}{a_x}$$

$$t_y = \exp\left[-\frac{(y \mp R_y)^2}{a_y^2}\right] =$$

$$\exp\left[-\frac{\{(y \mp d_y) \mp (R_y - d_y)\}^2}{a_y^2}\right] =$$

$$\exp\left[-\left(s - \frac{|y| - d_y}{a_y}\right)^2\right]$$

$$\therefore s + \sqrt{-\ln t_y} = \frac{|y| - d_y}{a_y}$$

Where "−" of the double sign corresponds to the positive value of x or y, and "+" corresponds to the negative value.

For the region inside the contour line of grade 1, we can get the following equations.

$$s - \sqrt{-\ln t_x} = \frac{|x| - d_x}{a_x}$$

$$s - \sqrt{-\ln t_y} = \frac{|y| - d_y}{a_y}$$

From these equations the desired composition operation is defined as follows:

$$t_x \diamond t_y =$$

$$\exp\left[-\left\{\sqrt{(s \pm \sqrt{-\ln t_x})^2 + (s \pm \sqrt{-\ln t_y})^2} - s\right\}^2\right]$$

Where the double sign is "+" when $|x| \geq Rx$ or $|y| \geq Ry$, and it is "−" when $|x| < Rx$ or $|y| < Ry$. Calculation is done by setting $tx = (tx)x = ax$ for $|x| < dx$ and $ty = (ty)y = ay$ for $|y| < dy$.

The value of the braces is positive when composition is done at the outside of the elliptic contour line of grade 1. In the case that composition is done at the inside of that line, the value of the braces is positive for the straight line part and is negative for elliptic part.

In the region of $|x| < Rx$ and $|y| < Ry$ (or $|x| > Rx$ and $|y| > Ry$), the composed value is determined according to the above conditions, when tx and ty are uniformly grade 1 in that region. That is, in the region of grade 1, the grade of x and that of y are similarly composed by assuming that the respective membership functions exist.

By the composition rule constructed above, a set of conventional type membership functions has the same effect as a membership function with an elliptic shape. Therefore, the information processing apparatus for the conventional type membership functions can be used to incorporate a fuzzy set with elliptic shape of boundary by the composition rule.

An extension of the idea of elliptic membership function and elliptic composition of conventional type membership functions to n-dimensional input system can be carried out as follows:

The extension is to construct an elliptic equigrade contour plane. The resulting elliptic membership function is given by following equations.

$$t = \exp\left[-\left\{\sqrt{\sum_{i=1}^{n} \frac{(|x_i| - d_i)^2}{a_i^2}} - s\right\}^2\right]$$

where $0 < s < s_k$, s.t. $s_k = \min (R_i/a_i)$,
$d_i = R_i - a_i s$.

If $|x| < d_i$, then calculation is done by setting $xi = di$. In the case that the value of the braces is positive, the input point exists at the outside of the contour plane of grade 1. In the negative case or $|xi| < di$ for all "i", the point exists at the inside of that plane.

The composition rule is as follows.

$$\diamond t_i =$$

$$\exp\left[-\left\{\sqrt{\Sigma(s \pm \sqrt{-\ln t_i})^2 + (s \pm \sqrt{-\ln t_n})^2} - s\right\}^2\right]$$

where $0 < s < s_k$, s.t. $s_k = \min (Ri/ai)$,
$d_i = R_i - a_i s$

And the double sign is as same as previous case. If $|x| < d_i$, then calculation is done by setting $ti = (ti)xi = ai$. In the case that the value of the braces is positive, the composition point is laying at the outside. In the negative case or $|xi| < di$ for all "i", the point is laying at the inside of that plane.

If more complex shape is needed to an elliptic membership function, an elliptic composition with respect to the polar coordinate form is useful. The resulting membership function is given by followings, but the composition rule is discussed in the next chapter.

$$t = \exp\left[-\left\{\sqrt{\frac{(|x| - d_x)^2}{a_x^2} + \frac{(|y| - d_y)^2}{a_y^2}} - s\right\}^2 - \frac{\{\tan^{-1}(y/x) - \psi\}^2}{a_{th}^2}\right]$$

where, $t_{th} = \exp[-(\theta - \psi)^2/a_{th}^2]$

In the case where the ellipse has its center at (A, B) and its axial angle $\phi$, the function becomes as follows.

$$t = \exp\left[-\left\{\sqrt{\frac{(|X| - d_X)^2}{a_X^2} + \frac{(|Y| - d_Y)^2}{a_Y^2}} - s\right\}^2 - \frac{\{\tan^{-1}(Y/X) - \psi'\}^2}{a_{th}^2}\right]$$

where, $$X = (x-A)\cos\phi + (y-B)\sin\phi$$

$$Y = -(x-A)\sin\phi + (y-B)\cos\phi$$

$$\psi' = \psi - \phi$$

For example, as the most simple case, if $Rx = Ry = 0$, $s = 0$, $\phi = 0$ and $t_{th} = 1$ then the function is $$t = \exp[-\{(x/a_x)^2 + (y/a_y)^2\}]$$

Figure 9A:
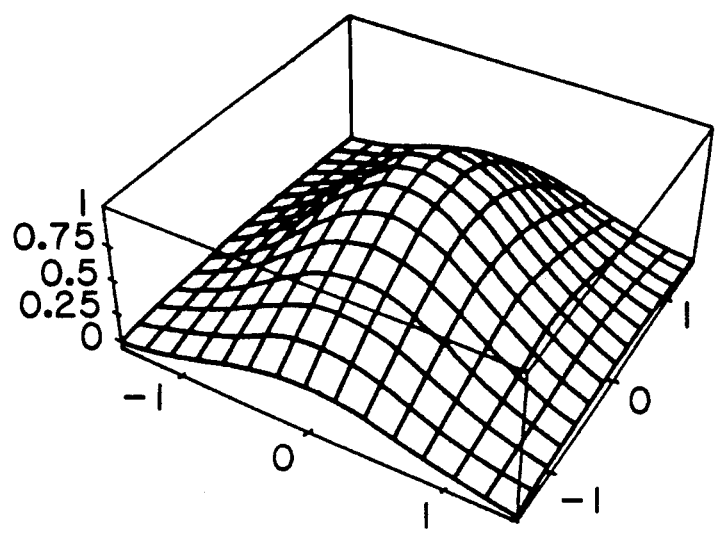
FIGS. 9A and 9B show a bell-like 3-dimensional elliptic membership function.
Figure 9B:
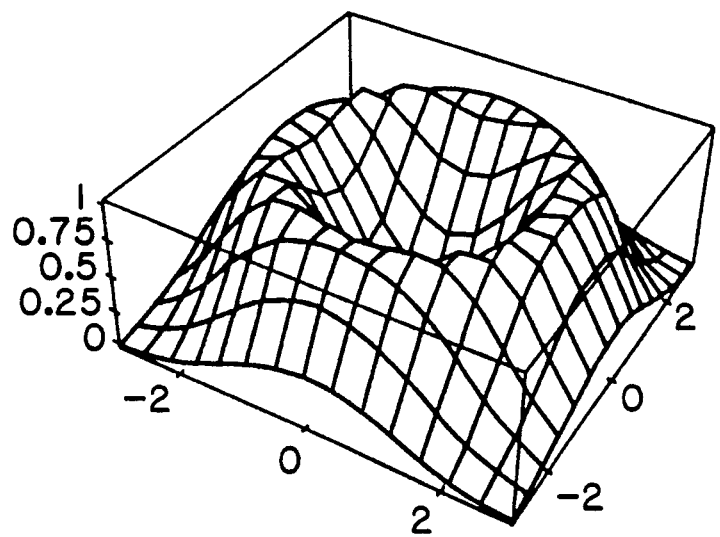

FIG. 9A is a graph of the bell-like shape membership function given by above equation. FIG.9B shows the case 7hen "s" is not equal to 0. These functions have elliptic shapes in their horizontal cross sections.

In the above stated case, the composition rule is $$t_x \diamondsuit t_y = t_x \cdot t_y$$

Similarly, the most simple shape in n-dimensional case is given by the following membership function or the composition rule.

$$t = \exp[-\Sigma(x_i/a_i)^2]$$

$$\diamondsuit t_i = \pi t_i$$

(1.2) Triangular shape membership function

FIG. 7 shows the membership function with elliptic equigrade contour line in the 3-dimensional space which consists of x-y orthogonal axis and degree of compatability. Notations used in the figure are as follows.

For the simplicity, the fiducial or the center point for constructing membership function is located the origin of the coordinate system.

F(x,y,rx,ry): a function which gives the elliptic shape of equigrade contour line tx = f(x): a bell-like shape membership function in x-tx plane ty = g(y): a bell-like shape membership function in y-ty plane Rx: x-directional radius of elliptic equi-grade contour line at grade 1

Ry: y-directional radius of elliptic equi-grade contour line at grade 1 ax: a parameter of f(x) which is proportional to fuzzy entropy with respect to x ay: a parameter of g(y) which is proportional to fuzzy entropy with respect to y rx: a distance between equi-grade contour line of grade 1 and that of arbitrary grade on x-tx plane ry: a distance between equi-grade contour line of grade 1 and that of arbitrary grade on y-ty plane t: grade of compatability of point (x,y) with respect to the desired membership function According to the above notations, an equi-grade contour line including some point (x,y) is expressed as follows.

$$\frac{x^2}{(R_x + r_x)^2} + \frac{y^2}{(R_y + r_y)^2} - 1 = 0$$

The membership functions f(x) and g(y) are $$t_x = f(x) = 0 \vee 1 + \frac{R_x \mp x}{a_x}$$

$$t_y = g(y) = 0 \vee 1 + \frac{R_y \mp y}{a_y}$$

where each "−" of the double sign corresponds to the positive value of x or y, and "+" corresponds to the negative value, respectively. The symbol "V" is a max-operator.

A distance between an arbitrary equi-grade contour line and the fiducial point on x-tx plane is $R_x + r_x$, and that on y-ty plane is $R_y + r_y$. That is, $$t = 1 + \frac{R_x \mp \{\pm(R_x + r_x)\}}{a_x} = 1 - \frac{r_x}{a_x}$$

$$\therefore r_x = a_x(1-t)$$

and $$t = 1 + \frac{R_y \mp \{\pm(R_y + r_y)\}}{a_y} = 1 - \frac{r_y}{a_y}$$

$$\therefore r_y = a_y(1-t)$$

Then, from these equations, followings must be satisfied.

$$\frac{x^2}{\{R_x + a_x(1-t)\}^2} + \frac{y^2}{\{R_y + a_y(1-t)\}^2} - 1 = 0$$

$$\frac{x^2/a_x^2}{\{R_x/a_x + (1-t)\}^2} + \frac{y^2/a_y^2}{\{R_y/a_y + (1-t)\}^2} - 1 = 0$$

To make the last equation reform to the explicit function of "t", denominators of the first and the second term must be the same. At first, we obtain minimum value $s_k$ as follows.

$$\min(R_x/a_x, R_y/a_y) = s_k$$

Then for arbitrary value "s" such that $0 < s < s_k$, dx and dy are calculated to satisfy $$\frac{R_x - d_x}{a_x} = \frac{R_y - d_y}{a_y} = s$$

That is, obtaining dx and dy by following equations, $$d_x = R_x - a_x s$$

$$d_y = R_y - a_y s$$

the function of equi-grade line is reformed as follows, $$\frac{(x \mp d_x)^2/a_x^2}{\{(R_x - d_x)/a_x + (1-t)\}^2} +$$

$$\frac{(y \mp d_y)^2/a_y^2}{\{(R_y - d_y)/a_y + (1-t)\}^2} - 1 = 0$$

where the double sign is interpreted as above. Therefore $$\therefore \frac{(|x| - d_x)^2/a_x^2}{\{s + (1 - t)\}^2} + \frac{(|y| - d_y)^2/a_y^2}{\{s + (1 - t)\}^2} - 1 = 0$$

holds.

The geometrical meaning of the last equation is illustratively shown in FIG. 8. That is, the equigrade contour line given by the equation has an elliptic shape with some straight line added. From the last equation we get $$s + (1 - t) = \sqrt{\frac{(|x| - d_x)^2}{a_x^2} + \frac{(|y| - d_y)^2}{a_y^2}}$$

$$\because s + (1 - t) > 0$$

$$\therefore t = 1 - \left\{ \sqrt{\frac{(|x| - d_x)^2}{a_x^2} + \frac{(|y| - d_y)^2}{a_y^2}} - s \right\} \vee 0$$

In the calculation of "t" we set $x = d_x$ for $|x| < d_x$ and $y = d_y$ for $|y| < d_y$. In the case that the chosen equigrade contour line exists at the outside of that of grade 1, the value of braces of the equation is positive.

By doing same reformation, the following equation is derived in the case that such contour line exists at the inside /f that of grade 1.

$$t = 1 + \left\{ \sqrt{\frac{(|x| - d_x)^2}{a_x^2} - \frac{(|y| - d_y)^2}{a_y^2}} - s \right\} \vee 0$$

In that case, we also calculate "t" by setting $x = d_x$ for $|x| < d_x$ and $y = d_y$ for $|y| < d_y$. The value of braces is positive for the point (x, y) laying on the straight part of contour line, and is negative for the point laying on the elliptic part.

Therefore, for both inside and outside cases, "t" is expressed only by the following equation.

$$t = 1 - \left| \sqrt{\frac{(|x| - d_x)^2}{a_x^2} + \frac{(|y| - d_y)^2}{a_y^2}} - s \right| \vee 0$$

When the inside (outside) region of the contour line of grade 1 is uniformly grade 1, the value of "t" is determined according to the above conditions.

In the same manner as the subsection (1.1), we show the composition rule of triangular shape conventional type membership functions on the elliptic equi-grade contour line.

In the region outside the contour line of grade 1, the grade of compatibility of x and that of y are given by the following equations, respectively.

$$t_x = 1 + \frac{R_x \mp x}{a_x} = 1 + \frac{(R_x - d_x) \mp (x \mp d_x)}{a_x} =$$

$$1 + s - \frac{|x| - d_x}{a_x}$$

$$\therefore s + (1 - t_x) = \frac{|x| - d_x}{a_x}$$

-continued $$t_y = 1 + \frac{R_y \mp y}{a_y} = 1 + \frac{(R_y - d_y) \mp (y \mp d_y)}{a_y} =$$

$$1 + s - \frac{|y| - d_y}{a_y}$$

$$\therefore s + (1 - t_y) = \frac{|y| - d_y}{a_y}$$

Where the double sign is interpreted as stated above.

For the region inside the contour line of grade 1, we can get the following equations.

$$s - (1 - t_x) = \frac{|x| - d_x}{a_x}$$

$$s - (1 - t_y) = \frac{|y| - d_y}{a_y}$$

From these equations the desired composition operation is defined as follows.

$$t_x \Diamond t_y = 1 - \left| \sqrt{\{s + (1 - t_x)\}^2 + \{s + (1 - t_y)\}^2} - s \right| \vee 0$$

Figure 10:
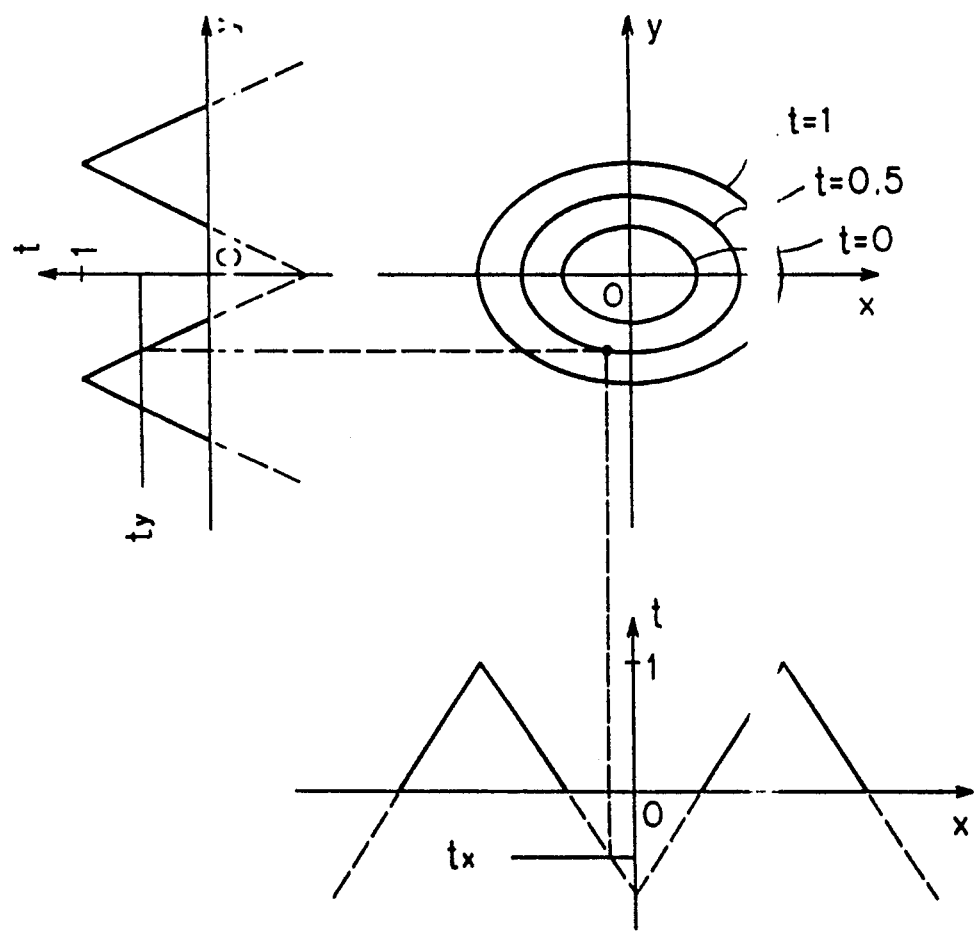
FIG. 10 shows an example of elliptic composition of a triangular membership function.

Calculation is done by setting $t_x = (t_x)_x = a_x$ for $|x| < d_x$ and $t_y = (t_y)_y = a_y$ for $|y| < d_y$. In the region where $t_x = 0$ or $t_y = 0$, as shown in FIG. 10, composition is done by regarding each triangular shape function as having its negative grade. This means that the max-operation with grade 0 is done after composition instead of being done before composition.

The practical value of the formula in the absolute value symbol is positive when composition is done at the outside of the elliptic contour line of grade 1. In the case that composition is done at the inside of that line, the value of the formula is positive for the straight line part and is negative for elliptic part.

In the region of $|x| < R_x$ and $|y| < R_y$ (or $|x| > R_x$ and $|y| > R_y$), the composed value is determined according to the above conditions, when tx and ty are uniformly grade 1 in that region. That is, in the region of grade 1, the grade of x and that of y are similarly composed by assuming that the respective membership functions exist.

An extension to n-dimensional input system can be similarly carried out to that stated in the previous subsection. The resulting elliptic membership function is given by following equations.

$$t = 1 - \left| \sqrt{\sum_{i=1}^{n} \frac{(|x_i| - d_i)^2}{a_i^2}} - s \right| \vee 0$$

where $0 < s < s_k$, s.t. $s_k = \min(R_i/a_i)$, $d_i = R_i - a_i s$.

If $|x_i| < d_i$, then calculation is done by setting $x_i = d_i$. In the case that the value of the formula in the absolute value symbol is positive, the input point exists at the outside of the contour plane of grade 1. In the negative case or $|x_i| < d_i$ for all "i", the point exists at the inside of that plane.

The composition rule is as follows.

$$\diamondsuit t_i = 1 - |\sqrt{\{s \pm (1 - t_i)\}^2} - s| \vee 0$$

where $0 < s < sk$, s.t. $sk = \min(Ri/ai)$, $di = Ri - ais$.

And the double sign is "+" at the outside and "−" at the inside. If $|x| < di$, then calculation is done by setting $ti = (ti)xi = ai$. In the case that the value of the formula in the absolute value symbol is positive, the composition point is laying at the outside. In the negative case or $|xi| < di$ for all "i", the point is laying at the inside of that plane.

An elliptic membership function expressed by the polar coordinate form is given as follows. But the composition rule with respect to the polar coordinate system is not discussed here but in the next chapter.

$$t = 1 - \sqrt{\left(\sqrt{\frac{(|x| - d_x)^2}{a_x^2} + \frac{(|y| - d_y)^2}{a_y^2}} - s\right)^2 + \frac{\{\tan^{-1}(y/x) - \psi\}^2}{a_{th}^2}}$$

$$t_{th} = 1 - \{|\theta - \psi|/a_{th}\}$$

In the case where the ellipse has its center at (A, B) and its axial angle $\phi$, the function becomes as follows.

$$t = 1 - \sqrt{\left(\sqrt{\frac{(|X| - d_x)^2}{a_x^2} + \frac{(|Y| - d_y)^2}{a_y^2}} - s\right)^2 + \frac{\{\tan^{-1}(Y/X) - \psi'\}^2}{a_{th}^2}}$$

where, $X = (x - A) \cos \phi + (y - B) \sin \phi$ $Y = -(x - A) \sin \phi + (y - B) \cos \phi$ $\psi' = \psi - \phi$ For example as the most simple case, if $Rx = Ry = 0$, $s = 0$, $\phi = 0$ and $t_{th} = 1$, then the function is $$t = 1 - \sqrt{(x/a_x)^2 + (y/a_y)^2}$$

Figure 11A:
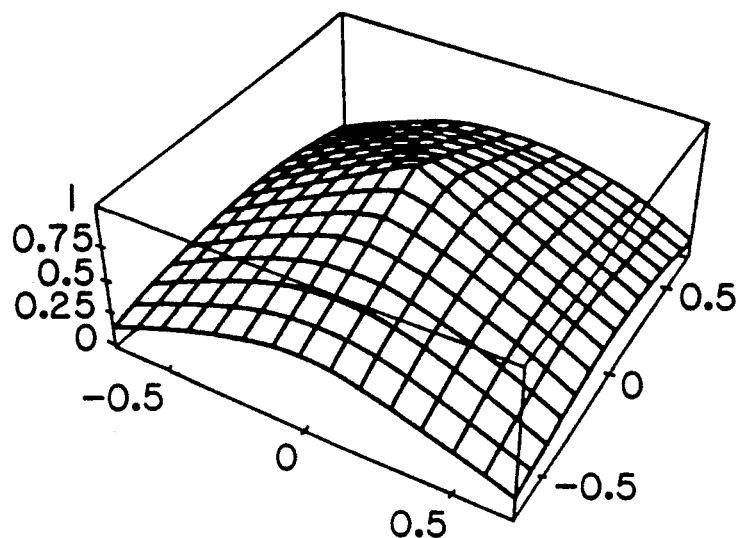
FIGS. 11A and 11B show shapes of 3-dimensional triangular membership function having an elliptic equi-grade contour line.
Figure 11B:
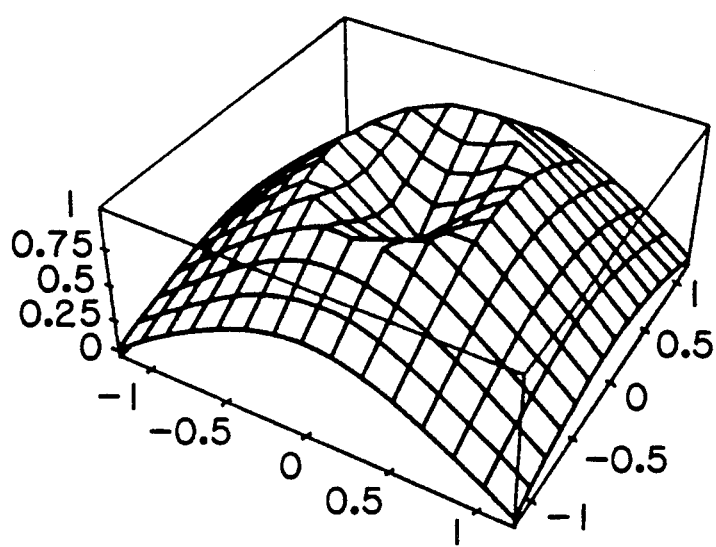

FIG. 11A is a graph of the triangular shape membership function given by above equation. FIG. 11B shows the case when "s" is not equal to 0. These functions have elliptic shapes in their horizontal cross sections.

In the above stated simple case, the composition rule is $$t_x \diamondsuit t_y = 1 - \sqrt{(1 - t_x)^2 + (1 - t_y)^2}$$

Similarly the most simple shape in n-dimensional case is given by the following membership function or the composition rule.

$$t = 1 - \sqrt{\Sigma (x_i/a_i)^2}$$

$$\diamondsuit t_i = 1 - \sqrt{\Sigma (1 - t_i)^2}$$

II. Elliptic composition of angles in polar coordinate system

This type of composition can construct a membership function with more complex shape.

(2.1) Composition of bell-like shape membership functions

Figure 12:
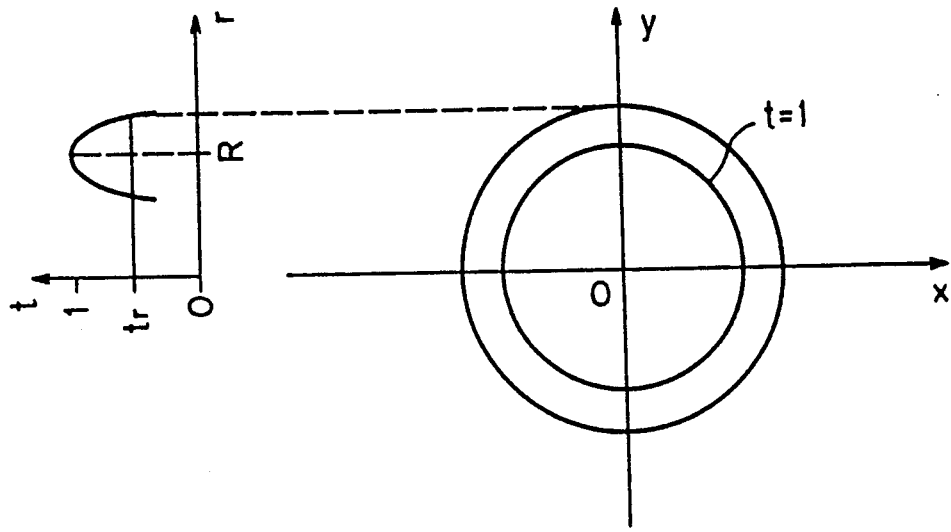
FIG. 12 shows a membership function having a circular equi-grade contour line.

FIG. 12 shows the membership function with circular equi-grade contour line, whose center is the origin, in the 3-dimensional space which consists of r-theta polar coordinates and degree of compatibility. Notations used in the figure are as follows:

R: radius of the circular contour line of grade 1

$t_r = f(r)$: a bell-like shape membership function on the radial direction $a_r$: a parameter of $f(r)$ which is proportional to fuzzy entropy with respect to r t: grade of compatibility of point (r, $\theta$) with respect to the desired membership function In this case $f(r)$ is given by the following equation.

$$t_r = f(r) = \exp\left[-\frac{(r - R)^2}{a_r^2}\right]$$

This is an expression of 3-dimensional circular membership function by polar coordinates form.

Figure 13:
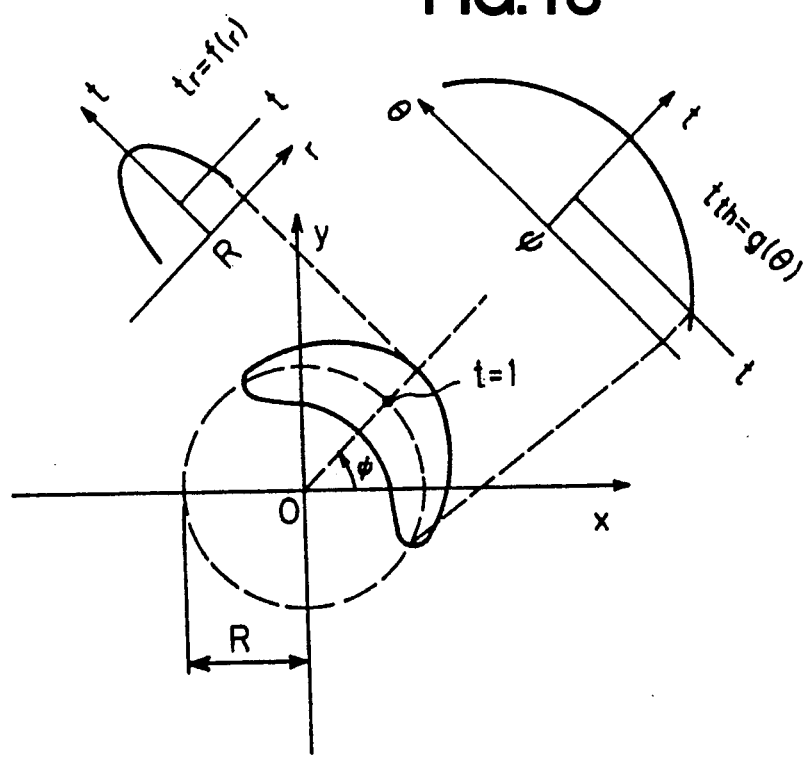
FIG. 13 shows the circular membership function having fuzziness in its circumferential direction in FIG. 12.
Figure 14:
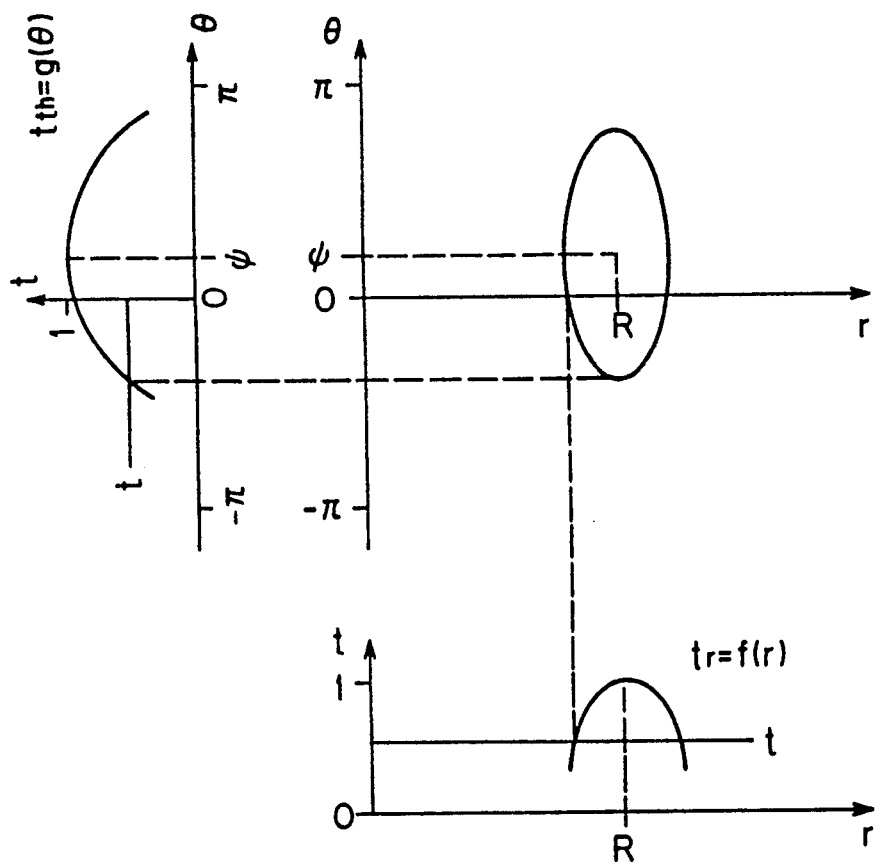
FIG. 14 shows a membership function having an elliptic equi-grade contour line in polar coordinate.

Furthermore, as shown in FIG. 13, we consider about membership functions by which the above 3-dimensional membership function has its fuzziness in the circumferential direction with grade 1 at angle $\psi$. Notations used in the figure are as follows:

R: radius of the circular contour line of grade 1

$t_r = f(r)$: a bell-like shape membership function on the radial direction at angle $\psi$.

$t_{th} = g(\theta)$: a bell-like shape membership function on the circumferential direction at radius r $a_r$: a parameter of $f(r)$ which is proportional to fuzzy entropy with respect to r $a_{th}$: a parameter of $g(\theta)$ which is proportional to fuzzy entropy with respect to $\theta$ t: grade of compatibility of point (r, $\theta$) with respect to the desired membership function In this case $f(r)$ and $g(\theta)$ are given as follows.

$$t_r = f(r) = \exp\left[-\frac{(r - R)^2}{a_r^2}\right]$$

$$t_{th} = g(\theta) = \exp\left[-\frac{(\theta - \psi)^2}{a_{th}^2}\right]$$

To express the membership function in FIG. 13, f(r) and g(θ) must be composed to construct a equi-grade contour line with particular shape. The shape is however difficult to define on the r−θ polar coordinates. Then it is defined on the r−θ orthogonal coordinates. For example, we use an elliptic equi-grade contour line. That is, we consider a 3-dimensional elliptic membership function whose center is (R, ψ) and this is the only point of grade 1. The resulting membership function is as follows.

$$t = \exp\left[-\frac{(r-R)^2}{a_r^2} - \frac{(\theta-\psi)^2}{a_{th}^2}\right]$$

By transforming the above function to the r−θ polar coordinates, we can derive such function as in FIG. 13.

Moreover, transforming it by using the following relations, $$r = \sqrt{x^2 + y^2}$$

$$\theta = \tan^{-1}(y/x)$$

we can get the function on the x-y orthogonal coordinates.

$$t = \exp\left[-\frac{(\sqrt{x^2+y^2}-R)^2}{a_r^2} - \frac{\{\tan^{-1}(y/x)-\psi\}^2}{a_{th}^2}\right]$$

By the following substitutions $$a_x = a_y = a_r$$

$$R/a_r = s$$

the function becomes $$t = \exp\left[-\left(\sqrt{\frac{x^2}{a_x^2}+\frac{y^2}{a_y^2}}-s\right)^2 - \frac{\{\tan^{-1}(y/x)-\psi\}^2}{a_{th}^2}\right]$$

and it is regarded as the formula which is derived from the previously discussed 3-dimensional elliptic membership function by elliptic composition of angles in polar coordinates form.

Figure 15:
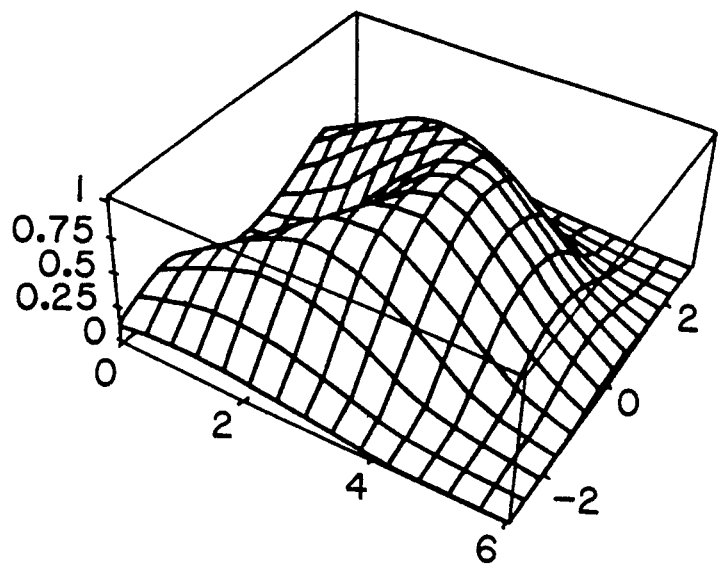
FIG. 15 shows the 3-dimensional elliptic membership &unction formed by elliptic composition of angles in polar coordinate.

As illustrative example of this function is shown in FIG. 15.

(2.2) Composition of triangular shape membership functions

FIG. 12 shows the membership function with circular equi-grade contour line, whose center is the origin, in the 3-dimensional space which consists of r−θ polar coordinates and degree of compatibility. Notations used in the figure are as follows.

R: radius of the circular contour line of grade 1

$t_r = f(r)$: a bell-like shape membership function on the radial direction $a_r$: a parameter of f(r) which is proportional to fuzzy entropy with respect to r t: grade of compatibility of point (r, θ) with respect to the desired membership function In this case f(r) is given by the following equation. This is an expression of 3-dimensional circular membership function by polar coordinates form.

$$t_r = f(r) = 1 - \frac{|r-R|}{a_r}$$

Furthermore, as shown in FIG. 13, we consider about membership functions by which the above 3-dimensional membership function has its fuzziness in the circumferential direction with grade 1 at angle ψ. Notations used in the figure are as follows.

R: radius of the circular contour line of grade 1

$t_r = f(r)$: a bell-like shape membership function on the radial direction at angle ψ.

$t_{th} = g(\theta)$: a bell-like shape membership function on the circumferential direction at radius r $a_r$: a parameter of f(r) which is proportional to fuzzy entropy with respect to r $a_{th}$: a parameter of g(θ) which is proportional to fuzzy entropy with respect to θ t: grade of compatability of point (r, θ) with respect to the desired membership function In this case f(r) and g(θ) are given as follows.

$$t_r = f(r) = 1 - \frac{|r-R|}{a_r}$$

$$t_{th} = g(\theta) = 1 - \frac{|\theta-\psi|}{a_{th}}$$

To express the membership function in FIG. 13, f(r) and g(θ) must be composed to construct a equi-grade contour line with particular shape. The shape is however difficult to define on the r-θ polar coordinates. Then, it is defined on the r-θ orthogonal coordinates. For example, we use an elliptic equi-grade contour line. That is, we consider a 3-dimensional elliptic membership function whose center is (R, ψ) and this is the only point of grade 1. The resulting membership function is as follows.

$$t = 1 - \sqrt{\frac{(r-R)^2}{a_r^2} + \frac{(\theta-\psi)^2}{a_{th}^2}}$$

By transforming the above function to the r-θ polar coordinates, we can derive such function as in FIG. 13.

Moreover, transforming it by using the following relations, $$r = \sqrt{x^2 + y^2}$$

$$\theta = \tan^{-1}(y/x)$$

we can get the function on the x-y orthogonal coordinates.

$$t = 1 - \sqrt{\frac{(\sqrt{x^2+y^2}-R)^2}{a_r^2} + \frac{\{\tan^{-1}(y/x)-\psi\}^2}{a_{th}^2}}$$

And by the following substitutions $$a_x = a_y = a_r$$

$R/a_r = s$ the function becomes $$t = 1 - \sqrt{\left(\sqrt{\frac{x^2}{a_x^2} + \frac{y^2}{a_y^2}} - s\right)^2 + \frac{\{\tan^{-1}(y/x) - \psi\}^2}{a_{th}^2}}$$

and it is regarded as the formula which is derived from the previously discussed 3-dimensional elliptic membership function by elliptic composition of angles in polar coordinates form.

III. Multi-dimensional parabolic membership function

In this chapter a multi-dimensional elliptic membership function is explained.

(3.1) Bell-like shape membership function

Figure 16:
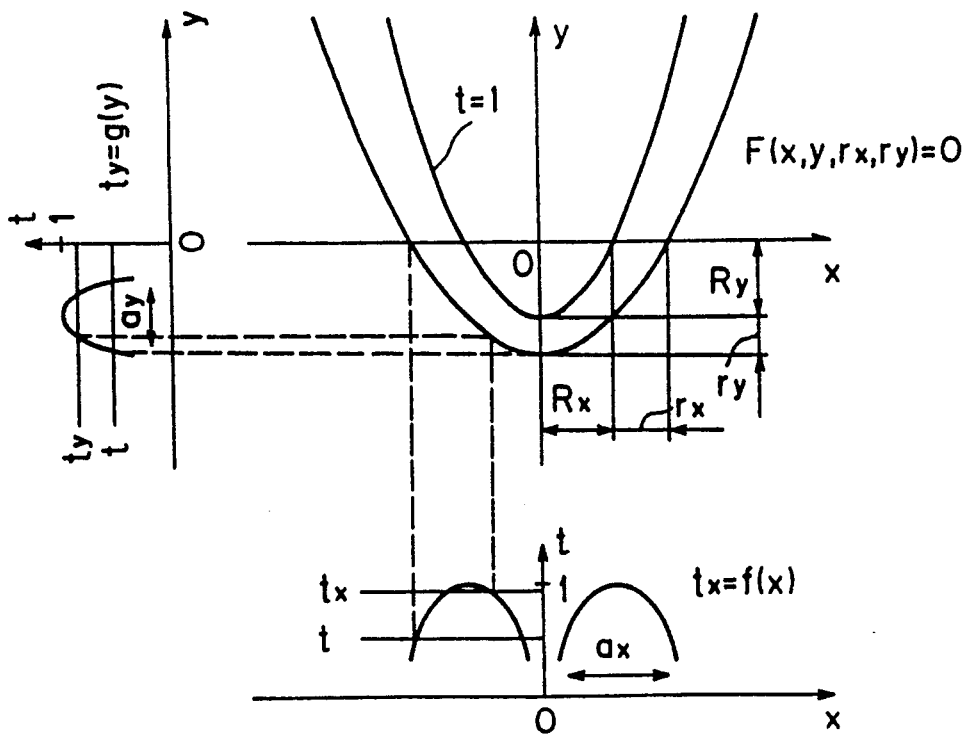
FIG. 16 shows an example of 3-dimensional parabolic membership function used in the present invention.

FIG. 16 shows the membership function with parabolic equi-grade contour line in the 3-dimensional space which consists of x-y orthogonal axis and degree of compatibility. Notations used in the figure are as follows.

For the simplicity, the fiducial or the center point for constructing membership function is located at the origin of the coordinate system.

F(x,y,rx,ry): a function which gives the parabolic shape of equi-grade contour line tx = f(x): a bell-like shape membership function in x-tx plane ty = g(y): a bell-like shape membership function in y-ty plane Rx: x-directional distance of parabolic equi-grade contour line at grade 1

Ry: y-directional distance of parabolic equi-grade contour line at grade 1 ax: a parameter of f(x) which is proportional to fuzzy entropy with respect to x ay: a parameter of g(y) which is proportional to fuzzy entropy with respect to y rx: a distance between equi-grade contour line of grade 1 and that of arbitrary grade on x-tx plane ry: a distance between equi-grade contour line of grade 1 and that of arbitrary grade on y-ty plane t: grade of compatibility of point (x,y) with respect to the desired membership function According to the above notations, a equi-grade contour line including some point (x,y) is expressed as follows.

$$\frac{x^2}{(R_x + r_x)^2} - \frac{y}{R_y + r_y} - 1 = 0$$

The membership functions f(x) and g(y) are $$t_x = f(x) = \exp\left[-\frac{(x \mp R_x)^2}{a_x^2}\right]$$

$$t_y = g(y) = \exp\left[-\frac{(y + R_y)^2}{a_y^2}\right]$$

where the double sign is "−" for x>0 and is "+" for x<0.

A distance between an arbitrary equi-grade contour line and the fiducial point on x-tx plane is Rx+rx, and that on y-ty plane is Ry+ry. That is, $$t = \exp\left[-\frac{\{\pm(R_x + r_x) \mp R_x\}^2}{a_x^2}\right] = \exp\left[-\frac{r_x^2}{a_x^2}\right]$$

$$\therefore r_x = a_x \sqrt{-\ln t}$$

and $$t = \exp\left[-\frac{\{-(R_y + r_y) + R_y\}^2}{a_y^2}\right] = \exp\left[-\frac{r_y^2}{a_y^2}\right]$$

$$\therefore r_y = a_y \sqrt{-\ln t}$$

Then, from these equations, followings must be satisfied.

$$\frac{x^2}{(R_x + a_x \sqrt{-\ln t})^2} - \frac{y}{R_y + a_y \sqrt{-\ln t}} - 1 = 0$$

$$\therefore \frac{x^2/a_x^2}{(R_x/a_x + \sqrt{-\ln t})^2} - \frac{y/a_y}{R_y/a_y + \sqrt{-\ln t}} - 1 = 0$$

To make the last equation reform to the explicit function of "t", denominators of the first and the second term must be the same. At first we obtain minimum value sx as follows.

$$\min(R_x/a_x, R_y/a_y) = s_k$$

Then for arbitrary value "s" such that $0 < s < s_k$, dx and dy are calculated to satisfy $$\frac{R_x - d_x}{a_x} = \frac{R_y - d_y}{a_y} = s$$

That is, obtaining dx and dy by following equations, $$d_x = R_x - a_x s$$

$$d_y = R_y - a_y s$$

the function of equi-grade line is reformed as follows, $$\frac{(x + d_x)^2/a_x^2}{\{(R_x - d_x)/a_x + \sqrt{-\ln t}\}^2} - \frac{(y + d_y)/a_y}{(R_y - d_y)/a_y + \sqrt{-\ln t}} - 1 = 0$$

Therefore $$\frac{(|x| - d_x)^2/a_x^2}{(s + \sqrt{-\ln t})^2} - \frac{(y + d_y)/a_y}{s - \sqrt{-\ln t}} - 1 = 0$$

Figure 17:
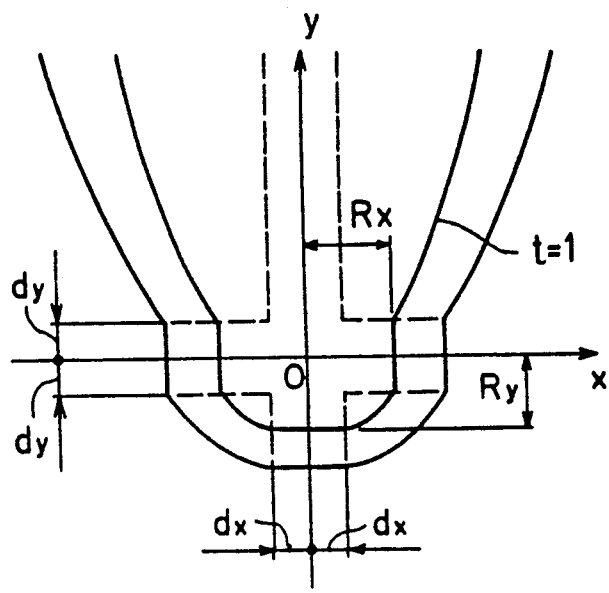
FIG. 17 shows shapes which consist of parabola and additional linear part.
Figure 18:
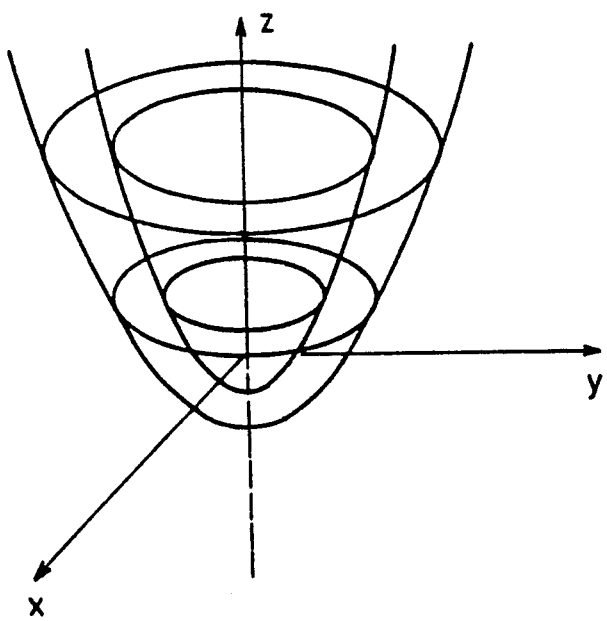
FIG. 18 shows a parabolic equi-grade contour plane of multi-dimensional membership function.

The geometrical meaning of the last equation is illustratively shown in FIG. 17. That is, the equi-grade contour line given by the equation has the parabolic shape with some straight line added. From the last equation we get $$s + \sqrt{-\ln t} = \frac{1}{2}\left(\sqrt{\frac{4(|x|-d_x)^2}{a_x^2} + \frac{(y+d_y)^2}{a_y^2}} - \frac{y+d_y}{a_y}\right)$$

$$\because s + \sqrt{-\ln t} > 0$$

$$\therefore t = \exp\left[-\left\{\frac{1}{2}\left(\sqrt{\frac{4(|x|-d_x)^2}{a_x^2} + \frac{(y+d_y)^2}{a_y^2}} - \frac{y+d_y}{a_y}\right) - s\right\}^2\right]$$

In the calculation of "t" we set $x = dx$ for $|x| < dx$ and $y = dy$ for $|y| < dy$. In the case that the chosen equi-grade contour line exists at the outside of that of grade 1, as shown in FIG. 16, the value of braces of the equation is positive.

By reforming the same equation is derived in the case that such contour line exists at the inside of that of grade 1. In that case, the value of braces is positive for the grint (x,y) laying on the straight part of contour line, and is negative for the point laying on the parabolic part.

When the inside (outside) region of the contour line of grade 1 is uniformly grade 1, the value of t is determined according to the above conditions.

When we use conventional type membership functions to be composed on the parabolic equi-grade contour line, the same effect is expected as the method using the parabolic membership function proposed here. The method of composition is as follows:

In the region outside the contour line of grade 1, the grade of compatibility of x and that of y are given by the following equations, respectively.

$$t_x = \exp\left[-\frac{(x+R_x)^2}{a_x^2}\right] =$$

$$\exp\left[-\frac{\{(x+d_x)+(R_x-d_x)\}^2}{a_x^2}\right] =$$

$$\exp\left[-\left(s - \frac{|x|-d_x}{a_x}\right)^2\right]$$

$$\therefore s + \sqrt{-\ln t_x} = \frac{|x|-d_x}{a_x}$$

$$t_x = \exp\left[-\frac{(y+R_y)^2}{a_y^2}\right] =$$

$$\exp\left[-\frac{\{(y+d_y)+(R_y-d_y)\}^2}{a_y^2}\right] =$$

-continued $$\exp\left[-\left(s - \frac{y+d_y}{a_y}\right)^2\right]$$

$$\therefore s + \sqrt{-\ln t_y} = -\frac{y+d_y}{a_y}$$

For the region inside the contour line of grade 1, we can get the following equations.

$$s - \sqrt{-\ln t_x} = \frac{|x|-d_x}{a_x}$$

$$s - \sqrt{-\ln t_y} = -\frac{y+d_y}{a_y}$$

From these equations the desired composition operation is defined as follows.

For $y < 0$,  (i)

$$t_x \diamond t_y = \exp\left[-\left\{(1/2) \cdot \left(\sqrt{4(s+\sqrt{-\ln t_x})^2 + (s+\sqrt{-\ln t_y})^2} + (s \pm \sqrt{-\ln t_y})\right) - s\right\}^2\right]$$

For $y > 0$,  (ii)

$$t_x \diamond t_y = \exp\left[-\left\{(1/2) \cdot \left(\sqrt{4(s+\sqrt{-\ln t_x})^2 + (s+\sqrt{-\ln t_y})^2} - (s \pm \sqrt{-\ln t_y})\right) - s\right\}^2\right]$$

Where the double sign is interpreted as same as above. Calculation is done by setting $tx = (tx)x = ax$ for $|x| < dx$ and $ty = (ty)y = ay$ for for $|y| < dy$.

The value of the braces is positive when composition is done at the outside of the parabolic contour line of grade 1. In the case that composition is done at the inside of that line, the value of the braces is positive for the straight line part and is negative for parabolic part.

In the region of $|x| < Rx$ and $y > -Ry$ (or $|x| > Rx$ and $y < -Ry$), the composed value is determined according to the above conditions, when tx and ty are uniformly grade 1 in that region. That is, in the region of grade 1, the grade of x and that of y are similarly composed by assuming that the respective membership functions exist.

By the composition rule constructed above, a set of conventional type membership functions has the same effect as a membership function with parabolic shape. Therefore, the information processing apparatus for the conventional type membership functions can be used to incorporate a fuzzy set with parabolic shape of boundary by the composition rule.

An extension of the idea of parabolic membership function and parabolic composition of conventional type membership functions to n-dimensional input system can be carried out as follows:

The extension is to construct an parabolic equi-grade contour plane shown in FIG. 12. The resulting parabolic membership function is given by following equations.

$$t = \exp\left[-\left\{\frac{1}{2}\left(\sqrt{\sum_{i=1}^{n-1}\frac{4(|x_i| - d_i)^2}{a_i^2} + \frac{(x_n + d_n)^2}{a_n^2}} - \frac{x_n + d_n}{a_n}\right) - s\right\}^2\right]$$

where $0 < s < s_k$, s.t. $s_k = \min(R_i/a_i)$,
$d_i = R_i - a_i s$.

If $|x| < d_i$, then calculation is done by setting $x_i = d_i$. In the case that the value of the braces is positive, the input point exists at the outside of the contour plane of grade 1. In the negative case or $|x_i| < d_i$ for all "i", the point exists at the inside of that plane.

The composition rule is as follows.

For $x_n < 0$, (i)

$$\Diamond t_i = \exp\left[-\left((1/2) \cdot \left(\sqrt{\Sigma 4(s + \sqrt{-\ln t_i})^2 + (s + \sqrt{-\ln t_n})^2} + (s \pm \sqrt{-\ln t_n})\right) - s\right)^2\right]$$

For $x_n > 0$, (ii)

$$\Diamond t_i = \exp\left[-\left((1/2) \cdot \left(\sqrt{\Sigma 4(s + \sqrt{-\ln t_i})^2 + (s + \sqrt{-\ln t_n})^2} - (s \pm \sqrt{-\ln t_n})\right) - s\right)^2\right]$$

where $0 < s < s_k$, s.t. $s_k = \min(R_i/a_i)$,
$d_i = R_i - a_i s$.

The double sign is used as same as previous case. If $|x| < d_i$, then calculation is done by setting $t_i = (t_i)x_i = a_i$. In the case that the value of the braces is positive, the composition point is laying at the outside. In the negative case or $|x_i| < d_i$ for all "i", the point is laying at the inside of that plane.

An parabolic composition with respect to the polar coordinate form can be done as the same manner discussed in chapter II. The resulting membership function on the 2-dimensional input space is given by following equations.

$$t = \exp\left[-\left\{\frac{1}{2}\left(\sqrt{\frac{4(|x| - d_x)^2}{a_x^2} + \frac{(y + d_y)^2}{a_y^2}} - \frac{y + d_y}{a_y}\right) - s\right\}^2 - \frac{\{\tan^{-1}(x/y) - \psi\}^2}{a_{th}^2}\right]$$

$$t_{th} = \exp[-(\theta - \psi)^2/a_{th}^2]$$

In the case where the parabola has its center at (A,B) and its axial angle $\psi$, the function becomes as follows.

$$t = \exp\left[-\left\{\frac{1}{2}\left(\sqrt{\frac{4(|X| - d_X)^2}{a_Y^2} + \frac{(Y + d_Y)^2}{a_Y^2}} - \frac{Y + d_Y}{a_Y}\right) - s\right\}^2 - \frac{\{\tan^{-1}(Y/X) - \psi'\}^2}{a_{th}^2}\right]$$

where, $X = (x - A)\cos\phi + (y - B)\sin\phi$ $Y = -(x - A)\sin\phi + (y - B)\cos\phi$ $\psi' = \psi - \phi$ For example as the most simple case, if $R_x = R_y = 0$, $s = 0$, $\psi = 0$ and $t_{th} = 1$, then the function is $$t = \exp[-\{(1/2) \cdot (\sqrt{4(x/a_x)^2 + (y/a_y)^2} - (y/a_y))\}^2]$$

Figure 19A:
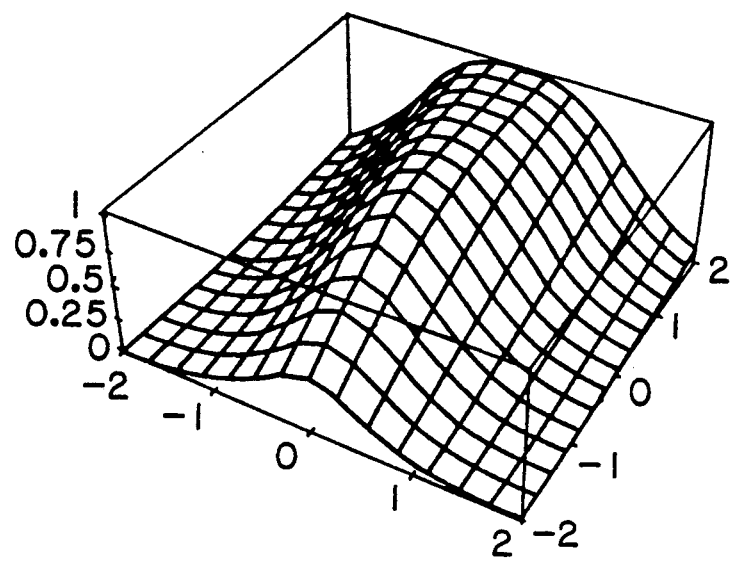
FIGS. 19A and 19B show a bell-like 3-dimensional parabolic membership function.
Figure 19B:
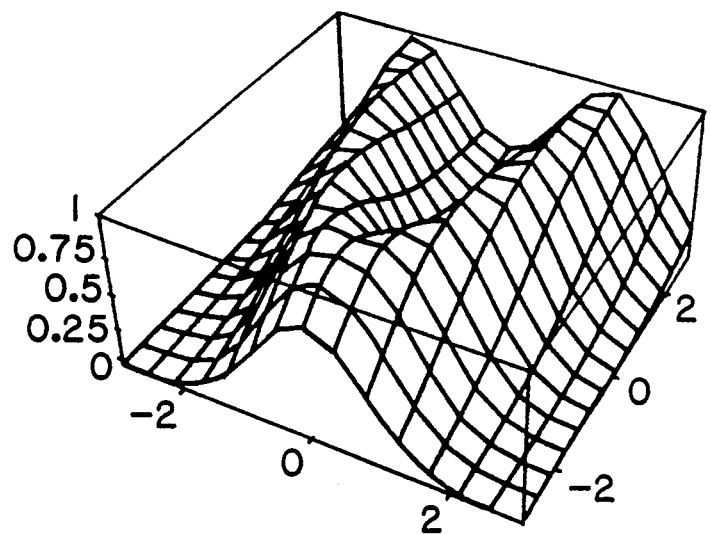

FIG. 19A is a graph of the bell-like shape membership function given by above equation. FIG. 19B shows the case when "s" is not equal to 0.

In this case, the composition rule is $$t_x \Diamond t_y = \exp[-\{(1/2) \cdot (\sqrt{-4\ln t_x - \ln t_y} \pm \sqrt{-\ln t_y})\}^2]$$

where the double sign is "−" for $y > 0$ and is "+" for $y < 0$.

Similarly the simplest shape in n-dimensional case is given by the following membership function or the composition rule.

$$t = \exp[-\{(1/2) \cdot (\sqrt{\Sigma 4(x_i/a_i)^2 + (x_n/a_n)^2} - (x_n/a_n))\}^2]$$

$$\Diamond t_i = \exp[-\{(1/2) \cdot (\sqrt{-\Sigma 4\ln t_i - \ln t_n} \pm \sqrt{-\ln t_n})\}^2]$$

where the double sign is "−" for $x_n > 0$ and is "+" for $x_n < 0$.

(3.2) Triangular shape membership function

FIG. 16 shows the membership function with parabolic equi-grade contour line in the 3-dimensional space which consists of x-y orthogonal axis and degree of compatibility. Notations used in the figure are as follows:

For the simplicity, the fiducial or the center point for constructing membership function is located at the origin of the coordinate system.

F(x,y,rx,ry): a function which gives the parabolic shape of equi-grade contour line tx=f(x): a triangular shape membership function in x-tx plane ty=g(y): a triangular shape membership function in y-ty plane Rx: x-directional radius of parabolic equi-grade contour line at grade 1

Ry: y-directional radius of parabolic equi-grade contour line at grade 1 ax: a parameter of f(x) which is proportional to fuzzy entropy with respect to x ay: a parameter of g(y) which is proportional to fuzzy entropy with respect to y rx: a distance between equi-grade contour line of grade 1 and that of arbitrary grade on x-tx plane ry: a distance between equi-grade contour line of grade 1 and that of arbitrary grade on y-ty plane t: grade of compatibility of point (x,y) with respect to the desired membership function According to the above notations, an equi-grade contour line including some point (x,y) is expressed as follows.

$$\frac{x^2}{(R_x \mp r_x)^2} - \frac{y}{R_y \pm r_y} - 1 = 0$$

And the membership functions f(x) and g(y) are $$t_x = f(x) = 0 \vee 1 + \frac{R_x \mp x}{a_x}$$

$$t_y = g(y) = 0 \vee 1 + \frac{R_y \pm y}{a_y}$$

where the double sign is "−" for x>0 and is "+" for x<0. The symbol "∨" is a max-operator.

A distance between an arbitrary equi-grade contour line and the fiducial point on x-tx plane is Rx+rx, and that on y-ty plane is Ry+ry. That is, $$t = 1 + \frac{R_x \mp \{\pm(R_x + r_x)\}}{a_x} = 1 - \frac{r_x}{a_x}$$

$$\therefore r_x = a_x(1 - t)$$

and $$t = 1 + \frac{R_y \pm \{-(R_y + r_y)\}}{a_y} = 1 - \frac{r_y}{a_y}$$

$$\therefore r_y = a_y(1 - t)$$

Then, from these equations, followings must be satisfied.

$$\frac{x^2}{\{R_x + a_x(1-t)\}^2} - \frac{y}{R_y + a_y(1-t)} - 1 = 0$$

$$\therefore \frac{x^2/a_x^2}{\{R_x/a_x + (1-t)\}^2} - \frac{y/a_y}{R_y/a_y + (1-t)} - 1 = 0$$

To make the last equation reform to the explicit function of "t", denominators of the first and the second term must be the same. At first, we obtain minimum value $s_k$ as follows.

$$\min(R_x/a_x, R_y/a_y) = s_k$$

Then, for arbitrary value "s" such that $0 < s < s_k$, dx and dy are calculated to satisfy $$\frac{R_x - d_x}{a_x} = \frac{R_y - d_y}{a_y} = s$$

That is, obtaining dx and dy by following equations, $$d_x = R_x - a_x s$$

$$d_y = R_y - a_y s$$

the function of equi-grade line is reformed as follows, $$\frac{(x \mp d_x)^2/a_x^2}{\{(R_x - d_x)/a_x + (1-t)\}^2} - \frac{(y \pm d_y)/a_y}{(R_y - d_y)/a_y + (1-t)} - 1 = 0$$

where the double sign is interpreted as above. Therefore, $$\frac{(|x| - d_x)^2/a_x^2}{\{s + (1-t)\}^2} - \frac{(y + d_y)/a_y}{s + (1-t)} - 1 = 0$$

holds.

The geometrical meaning of the last equation is illustratively shown in FIG. 17. That is, the equi-grade contour line given by the equation has the parabolic shape with some straight line added. From the last equation we get $$s + (1-t) = \frac{1}{2}\left\{\sqrt{\frac{4(|x| - d_x)^2}{a_x^2} + \frac{(y + d_y)^2}{a_y^2}} - \frac{y + d_y}{a_y}\right\}$$

$$\because s + (1-t) > 0$$

$$\therefore t = 1 - $$

$$\left[\frac{1}{2}\left\{\sqrt{\frac{4(|x| - d_x)^2}{a_x^2} + \frac{(y + d_y)^2}{a_y^2}} - \frac{y + d_y}{a_y}\right\} - s\right] \vee 0$$

In the calculation of "t" we set x=dx for $|x| < dx$ and y=dy for $|y| < dy$. In the case that the chosen equi-grade contour line exists at the outside of that of grade 1, the value of braces of the equation is positive. By doing same reformation, the following equation is derived in the case that such contour line exists at the inside of that of grade 1.

$$t = 1 + $$

$$\left[\frac{1}{2}\left\{\sqrt{\frac{4(|x| - d_x)^2}{a_x^2} - \frac{(y - d_y)^2}{a_y^2}} - \frac{y + d_y}{a_y}\right\} - s\right] \vee 0$$

In that case, we also calculate "t" by setting x=dx for $|x| < dx$ and y=dy for $|y| < dy$. The value of braces is positive for the point (x, y) laying on the straight part of contour line, and is negative for the point laying on the parabolic part.

Therefore, for both inside and outside cases, "t" is expressed only by the following equation.

$$t = 1 - \left| \frac{1}{2} \left\{ \sqrt{\frac{4(|x| - d_x)^2}{a_x^2} + \frac{(y + d_y)^2}{a_y^2}} - \frac{y + d_y}{a_y} \right\} - s \right| \vee 0$$

When the inside (outside) region of the contour line of grade 1 is uniformly grade 1, the value of t is determined according to the above conditions.

In the same manner as the subsection (3.1), we show the composition rule of triangular shape conventional type membership &unctions on the parabolic equi-grade contour line.

In the region outside the contour line of grade 1, the grade of compatibility of x and that of y are given by the following equations, respectively.

$$t_x = 1 + \frac{R_x + x}{a_x} = 1 + \frac{(R_x - d_x) + (x + d_x)}{a_x} =$$

$$1 + s - \frac{|x| - d_x}{a_x}$$

$$\therefore s + (1 - t_x) = \frac{|x| - d_x}{a_x}$$

where the double sign is "−" for x > 0 and is "+" for x > 0.

$$t_y = 1 + \frac{R_y + y}{a_y} = 1 + \frac{(R_y - d_y) + (y + d_y)}{a_y} =$$

$$1 + s + \frac{y + d_y}{a_y}$$

$$\therefore s + (1 - t_y) = -\frac{y + d_y}{a_y}$$

For the region inside the contour line of grade 1, we can get the following equations.

$$s - (1 - t_x) = \frac{|x| - d_x}{a_x}$$

$$s - (1 - t_y) = -\frac{y + d_y}{a_y}$$

From these equations the desired composition operation is defined as follows.

For y < 0,                 (i)

$$t_x \Diamond t_y = 1 - |(1/2) \cdot [\sqrt{4\{s + (1 - t_x)\}^2 + \{s + (1 - t_y)\}^2} + \{s + (1 - t_y)\}] - s|$$

For y > 0,                 (ii)

$$t_x \Diamond t_y = 1 - |(1/2) \cdot [\sqrt{4\{s + (1 - t_x)\}^2 + \{s + (1 - t_y)\}^2} - \{s + (1 - t_y)\}] - s|$$

Where the double sign is interpreted as above. Calculation is done by setting tx = (tx) x = ax for |x| < dx and ty = (ty) y = ay &/r |y| < dy.

In the region where tx = 0 or ty = 0, as shown in FIG. 10, composition is done by regarding each triangular shape function as having its negative grade. This means that the max-operation with grade 0 is done after composition instead of being done before composition.

The practical value of the formula in the absolute value symbol is positive when composition is done at the outside of the parabolic contour line of grade 1. In the case that composition is done at the inside of that line, the value of the formula is positive for the straight line part and is negative for parabolic part.

In the region of |x| < Rx and y > −Ry (or |x| > Rx and y < −Ry), the composed value is determined according to the above conditions, when tx and ty are uniformly grade 1 in that region. That is, in the region of grade 1, the grade of x and that of y are similarly composed by assuming that the respective membership functions exist.

An extension to n-dimensional input system can be similarly carried out to that stated in the previous subsection.

The resulting parabolic membership function is given by following equations.

$$t = 1 - \left| \frac{1}{2} \left\{ \sqrt{\sum_{i=1}^{n-1} \frac{4(|x_i| - d_i)^2}{a_i^2} + \frac{(x_n + d_n)^2}{a_n^2}} - \frac{x_n + d_n}{a_n} \right\} - s \right|$$

where $0 < s < s_k$, s.t. $s_k = \min (R_i/a_i)$,
$d_i = R_i - a_i s$.

If |x| < di, then calculation is done by setting xi = di. In the case that the value of the formula in the absolute value symbol is positive, the input point exists at the outside of the contour plane of grade 1. In the negative case or |x| < di for all "i", the point exists at the inside of that plane.

The composition rule is as follows.

For $x_n$ < 0,                (i)

$$\Diamond t_i = 1 - |(1/2) \cdot [\sqrt{\Sigma 4\{s \pm (1 - t_i)\}^2 + \{s \pm (1 - t_n)\}^2} + \{s \pm (1 - t_n)\}] - s|$$

For $x_n$ > 0,                (ii)

$$\Diamond t_i = 1 - |(1/2) \cdot [\sqrt{\Sigma 4\{s \pm (1 - t_i)\}^2 + \{s \pm (1 - t_n)\}^2} - \{s \pm (1 - t_n)\}] - s|$$

where $0 < s < s_k$, s.t. $s_k = \min (R_i/a_i)$,
$d_i = R_i - a_i s$.

The double sign is "+" at the outside and "−" at the inside. If |x| < di, then calculation is done by setting ti = (ti)xi = ai. In the case that the value of the formula in the absolute value symbol is positive, the composition point is laying at the outside. In the negative case or |x| < di for all "i", the point is laying at the inside of that plane.

An parabolic membership function expressed by the polar coordinate form is given as follows.

$$t = 1 - \left[\sqrt{\frac{1}{2}\left\{\sqrt{\frac{4(|x| - d_x)^2}{a_x^2} + \frac{(y + d_y)^2}{a_y^2}} - \frac{y + d_y}{a_y}\right\} - s}\right]^2 + \frac{\{\tan^{-1}(y/x) - \psi\}^2}{a_{th}^2}$$

$$t_{th} = 1 - \{|\theta - \psi|/a_{th}^2\}$$

In the case where the parabola has its center at (A, B) and its axial angle $\psi$, the function becomes as follows.

$$t = 1 - \left[\sqrt{\frac{1}{2}\left\{\sqrt{\frac{4(|X| - d_X)^2}{a_Y^2} + \frac{(Y + d_Y)^2}{a_Y^2}} - \frac{Y + d_Y}{a_Y}\right\} - s}\right]^2 - \frac{\{\tan^{-1}(Y/X) - \psi'\}^2}{a_{th}^2}$$

where, $$X = (x - A) \cos \phi + (y - B) \sin \phi$$

$$Y = -(x - A) \sin \phi + (y - B) \cos \cos \phi$$

$$\psi' = \psi - \phi$$

For example as the most simple case, if $Rx = Ry = 0$, $s = 0$, $\psi = 0$ and $t_{th} = 1$, then the function is $$t = 1 - (1/2) \cdot \{\sqrt{4(x/a_x)^2 + (y/a_y)^2} - (y/a_y)\}$$

Figure 20A:
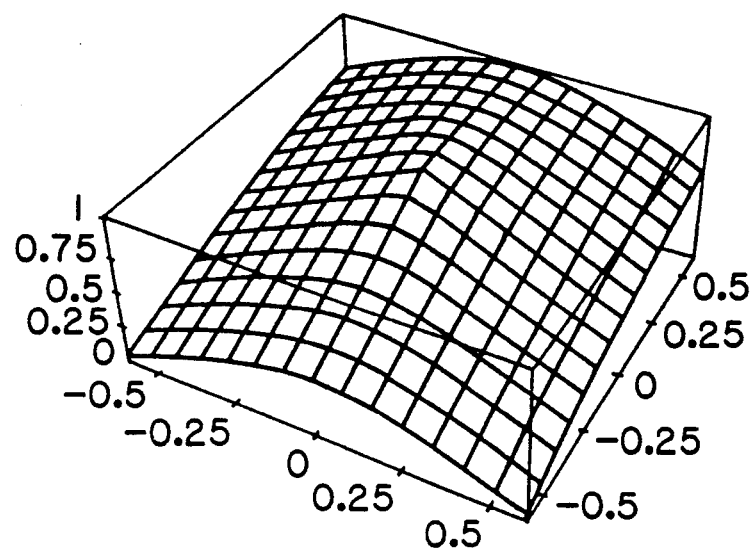
FIGS. 20A and 20B show shapes of 3-dimensional triangular membership function having a parabolic equi-grade contour line.
Figure 20B:
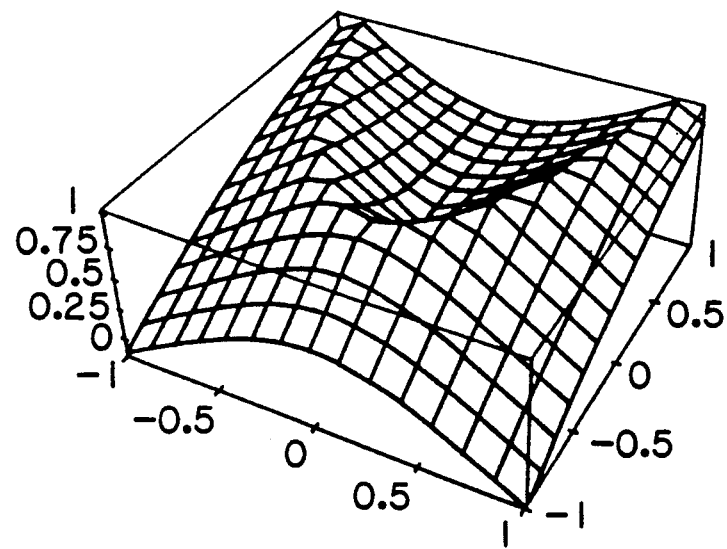

FIG. 20A is a graph of the triangular shape membership function given by above equation. FIG. 20B shows the case when "s" is not equal to 0. These functions have parabolic shapes in their horizontal cross sections.

In the above stated simple case, the composition rule is $$t_x \diamond t_y = 1 - (1/2) \cdot \{\sqrt{-4(1 - t_x)^2 - (1 - t_y)^2} \pm (1 - t_y)\}$$

where the double sign is "−" for $y > 0$ and is "+" for $y < 0$.

Similarly the most simple shape in n-dimensional case is given by the following membership function or the composition rule.

$$t = 1 - (1/2) \cdot \{\sqrt{\Sigma 4 (x_i/a_i)^2 + (x_n/a_n)^2} - (x_n/a_n)\}$$

$$\diamond t_i = 1 - (1/2) \cdot \{\sqrt{-\Sigma 4 (1 - t_i)^2 - (1 - t_n)^2} \pm (1 - t_n)\}$$

where the double sign is "−" for $x_n > 0$ and is "+" for $x_n < 0$.

Figure 21:
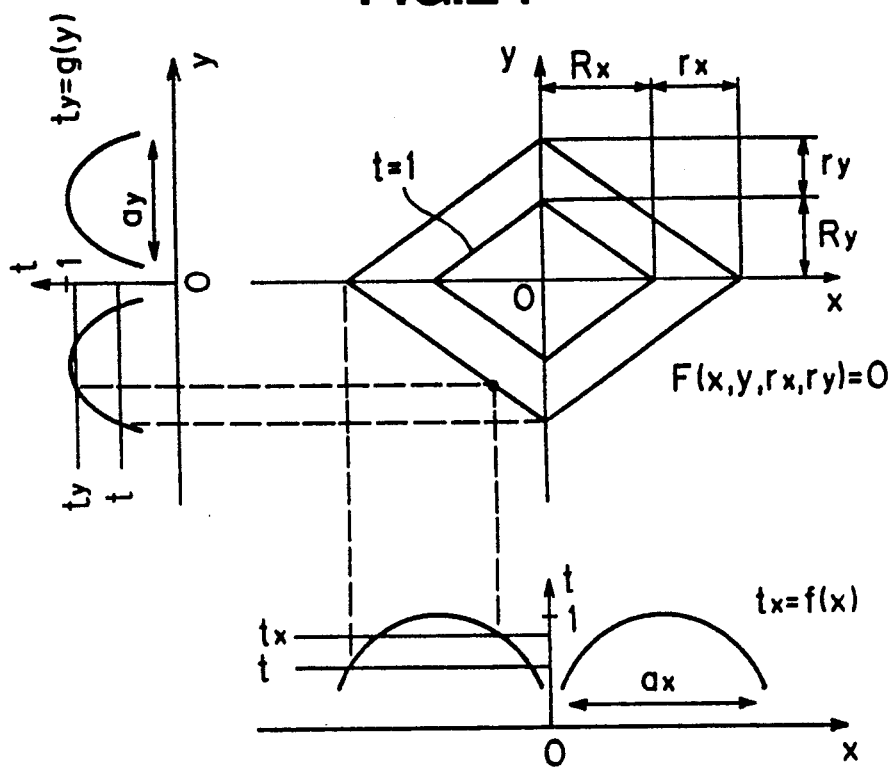
FIG. 21 shows an example of 3-dimensional rhombic membership function used in the present invention.

IV. Multi-dimensional rectangular membership function (4.1) Bell-like shape membership function FIG. 21 shows the membership function with rhombic equi-grade contour line in the 3-dimensional space 7hich consists of x-y orthogonal axis and degree of compatibility. Notations used in the figure are as follows.

For the simplicity, the fiducial point for constructing membership function is located at the origin of the coordinate system.

F(x,y,rx,ry): a function which gives the rhombic shape of equi-grade contour line tx = f(x): a bell-like shape membership function in x-tx plane ty = g(y): a bell-like shape membership function in y-ty plane Rx: x-directional distance of rhombic equi-grade contour line at grade 1

Ry: y-directional distance of rhombic equi-grade contour line at grade 1 ax: a parameter of f(x) which is proportional to fuzzy entropy with respect to x ay: a parameter of g(y) which is proportional to fuzzy entropy with respect to y rx: a distance between equi-grade contour line of grade 1 and that of arbitrary grade on x-tx plane ry: a distance between equi-grade contour line of grade 1 and that of arbitrary grade on y-ty plane t: grade of compatibility of point (x,y) with respect to the desired membership function According to the above notations, a equi-grade contour line including some point (x,y) is expressed as follows.

$$\frac{|x|}{R_x + r_x} + \frac{|y|}{R_y + r_y} - 1 = 0$$

The membership functions f(x) and g(y) are $$t_x = f(x) = \exp\left[-\frac{(x \mp R_x)^2}{a_x^2}\right]$$

$$t_y = g(y) = \exp\left[-\frac{(y \mp R_y)^2}{a_y^2}\right]$$

where the double signs are "−" for $x > 0$ and $y > 0$, and are "+" for $x < 0$ and $y < 0$.

A distance between an arbitrary equi-grade contour line and the fiducial point on x-tx plane is $Rx + rx$, and that on y-ty plane is $Ry + ry$. That is, $$t = \exp\left[-\frac{\{\pm(R_x + r_x) \mp R_x\}^2}{a_x^2}\right] = \exp\left[-\frac{r_x^2}{a_x^2}\right]$$

$$\therefore r_x = a_x \sqrt{-\ln t}$$

and $$t = \exp\left[-\frac{\{\pm(R_y + r_y) \mp R_y\}^2}{a_y^2}\right] = \exp\left[-\frac{r_y^2}{a_y^2}\right]$$

-continued $$\therefore r_y = a_y \sqrt{-\ln t}$$

Then, from these equations, followings must be satisfied.

$$\frac{|x|}{R_x + a_x \sqrt{-\ln t}} + \frac{|y|}{R_y + a_y \sqrt{-\ln t}} - 1 = 0$$

$$\therefore \frac{|x|/a_x}{R_x/a_x + \sqrt{-\ln t}} + \frac{|y|/a_y}{R_y/a_y + \sqrt{-\ln t}} - 1 = 0$$

To make the last equation reform to the explicit function of "t", denominators of the first and the second term must be the same. At first, we obtain minimum value $s_k$ as follows.

$$\min(R_x/a_x, R_y/a_y) = s_k$$

Then for arbitrary value "s" such that $0 < s < s_k$, dx and dy are calculated to satisfy $$\frac{R_x - d_x}{a_x} = \frac{R_y - d_y}{a_y} = s$$

That is, obtaining dx and dy by following equations, $$d_x = R_x - a_x s$$

$$d_y = R_y - a_y s$$

the function of equi-grade line is reformed as follows, $$\frac{|x + d_x|/a_x}{(R_x - d_x)/a_x + \sqrt{-\ln t}} +$$

$$\frac{|y + d_y|/a_y}{(R_y - d_y)/a_y + \sqrt{-\ln t}} - 1 = 0$$

Therefore $$\frac{||x| - d_x|/a_x}{s + \sqrt{-\ln t}} + \frac{||y| - d_y|/a_y}{s + \sqrt{-\ln t}} - 1 = 0$$

holds.

Figure 22:
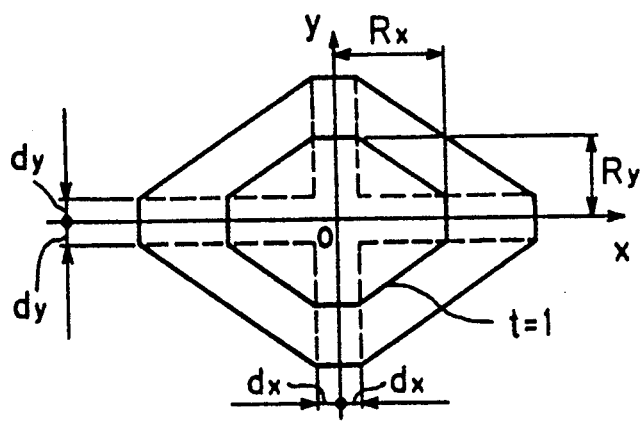
FIG. 22 shows shapes which consist of rhombus and additional linear part.

The geometrical meaning of the last equation is illustratively shown in FIG. 22. That is, the equi-grade contour line given by the equation has the rhombic shape with some straight line added. From the last equation we get $$s + \sqrt{-\ln t} = \frac{||x| - d_x|}{a_x} + \frac{||y| - d_y|}{a_y}$$

$$\therefore s + \sqrt{-\ln t} > 0$$

$$\therefore t = \exp\left[-\left(\frac{||x| - d_x|}{a_x} + \frac{||y| - d_y|}{a_y} - s\right)^2\right]$$

In the calculation of "t" we set $x = d_x$ for $|x| < d_x$ and $y = d_y$ for $|y| < d_y$. In the case that the chosen equi-grade contour line exists at the outside of that of grade 1, as shown in FIG. 21, the value of braces of the equation is positive.

By doing same reformation, the same equation is derived in the case that such contour line exists at the inside of that of grade 1. In that case, the value of braces is positive for the point (x, y) laying on the straight part of contour line, and is negative for the point laying on the rhombic part. When the inside (outside) region of the contour line of grade 1 is uniformly grade 1, the value of "t" is determined according to the above conditions.

Figure 23:
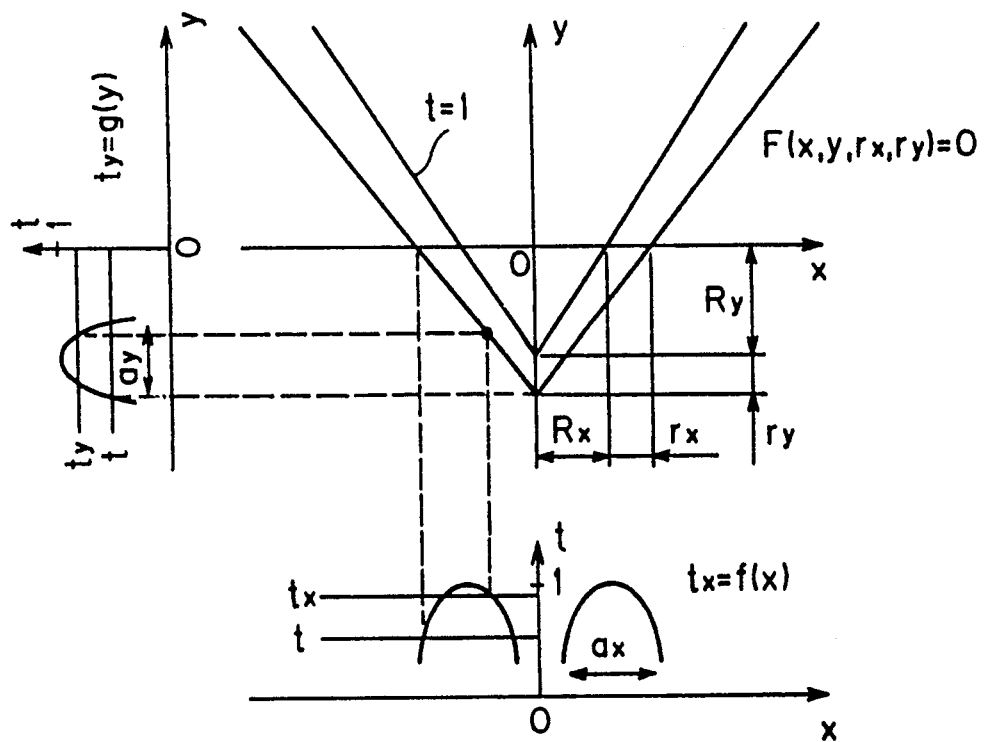
FIG. 23 shows a membership function having a V-shaped equi-grade contour line.

When the desired membership function has a V-like shape equi-grade contour line as shown in FIG. 23, it is given by the following equation.

$$t = \exp\left[-\left(\frac{||x| - d_x|}{a_x} - \frac{y + d_y}{a_y} - s\right)^2\right]$$

Figure 24:
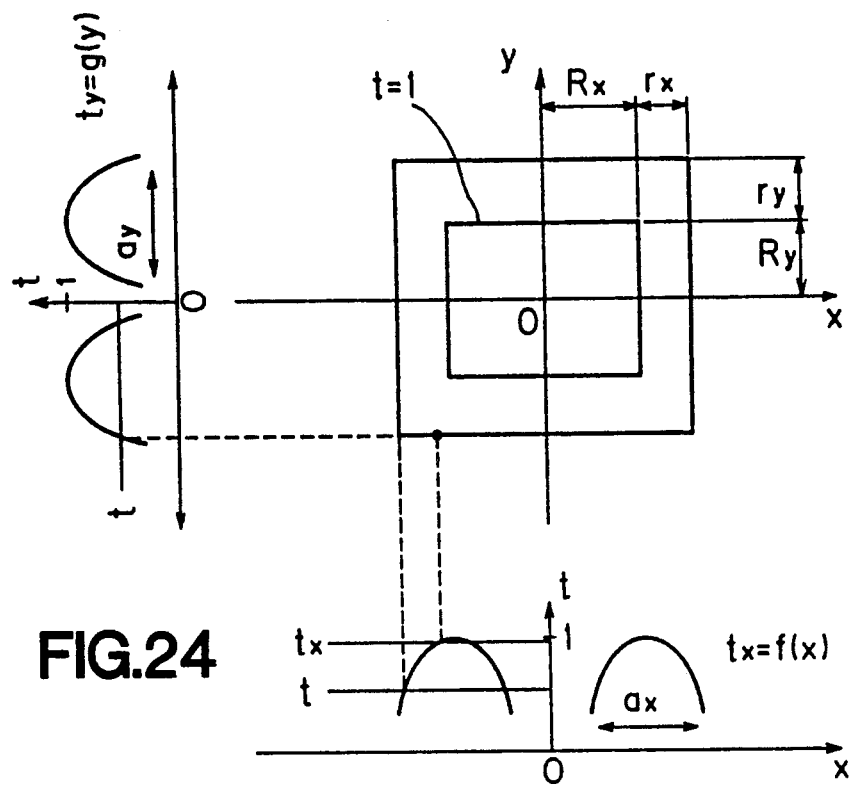
FIG. 24 shows a membership function having a rectangular equi-grade contour line.
Figure 25:
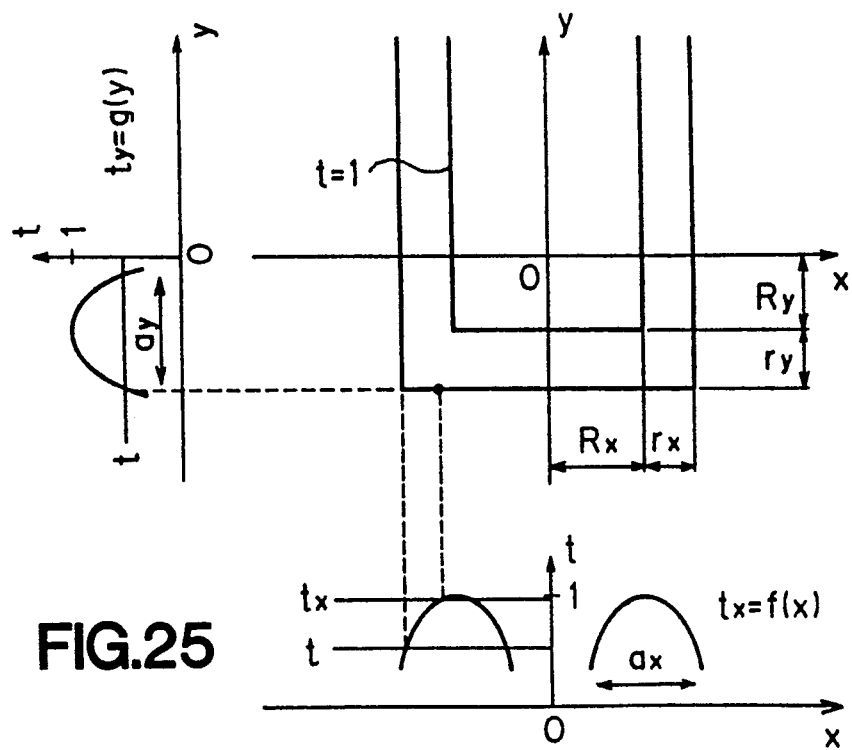
FIG. 25 shows a membership function having a box-like equi-grade contour line.

Moreover, a membership function of rectangle contour line as shown in FIG. 24 is $$t = \exp[-(|x| - R_x)^2/a_x^2](||y| - d_y|/a_y < ||x| - d_x|/a_x)$$

$$t = \exp[-(|y| - R_y)^2/a_y^2](||y| - d_y|/a_y > ||x| - d_x|/a_x)$$

and that of box-like contour line as shown in FIG. 25 is $$t = \exp[-(|x| - R_x)^2/a_x^2](||y| - d_y|/a_y < ||x| - d_x|/a_x \text{ or } y > 0)$$

$$t = \exp[-(y + R_y)^2/a_y^2](||y| - d_y|/a_y > ||x| - d_x|/a_x \text{ and } y < 0)$$

Their expressions are the same as the ordinary ones.

When we use conventional type membership functions to be composed on the rhombic equi-grade contour line, the same effect is expected as the method using the rhombic membership function proposed here. The method of composition is as follows:

In the region outside the contour line of grade 1, the grade of compatibility of x and that of y are given by the following equations, respectively.

$$t_x = \exp\left[-\frac{(x \mp R_x)^2}{a_x^2}\right] =$$

$$\exp\left[-\frac{\{(x \mp d_x) \mp (R_x - d_x)\}^2}{a_x^2}\right] =$$

$$\exp\left[-\left(s - \frac{|x| - d_x}{a_x}\right)^2\right]$$

$$\therefore s + \sqrt{-\ln t_x} = \frac{|x| - d_x}{a_x}$$

$$t_y = \exp\left[-\frac{(y \mp R_y)^2}{a_y^2}\right] =$$

$$\exp\left[-\frac{\{(y \mp d_y) \mp (R_y - d_y)\}^2}{a_y^2}\right] =$$

$$\exp\left[-\left(s - \frac{|y| - d_y}{a_y}\right)^2\right]$$

-continued $$\therefore s + \sqrt{-\ln t_y} = \frac{|y| - d_y}{a_y}$$

For the region inside the contour line of grade 1, we can get the following equations.

$$s - \sqrt{-\ln t_x} = \frac{|x| - d_x}{a_x}$$

$$s - \sqrt{-\ln t_y} = \frac{|y| - d_y}{a_y}$$

From these equations the desired composition operation is defined as follows.

$$t_x \diamond t_y = \exp[-(|s \pm \sqrt{-\ln t_x}| + |s \pm \sqrt{-\ln t_y}| - s)^2]$$

Where the double sign is interpreted as same as above. Calculation is done by setting tx=(tx)x=ax for $|x|<dx$ and ty=(ty)y=ay for $|y|<dy$.

The value of the parentheses is positive when composition is done at the outside of the rhombic contour line of grade 1. In the case that composition is done at the inside of that line, the value of the parentheses is positive for the straight line part and is negative for rhombic part.

In the region of $|x|<Rx$ and $|y|<Ry$ (or $|x|>Rx$ and $|y|>Ry$), the composed value is determined according to the above conditions, when tx and ty are uniformly grade 1 in that region. That is, in the region of grade 1, the grade of x and that of y are similarly composed by assuming that the respective membership functions exist.

By the composition rule constructed above, a set of conventional type membership functions has the same effect as a membership function with rhombic shape. Therefore, the information processing apparatus for the conventional type membership functions can be used to incorporate a fuzzy set with rhombic shape of boundary by the composition rule.

When the conventional type membership functions are composed on V-shaped equi-grade contour line, the composition rule is given as follows:

For $y < 0$, (i)

$$t_x \diamond t_y = \exp[-\{|s \pm \sqrt{-\ln t_x}| + (s \pm \sqrt{-\ln t_y}) - s\}^2]$$

For $y > 0$, (ii)

$$t_x \diamond t_y = \exp[-\{|s \pm \sqrt{-\ln t_x}| - (s \pm \sqrt{-\ln t_y}) - s\}^2]$$

where the double signs are the same as above.
Moreover, when they are composed on rectangle contour line or box-like contour line, the rule is $$t_x \diamond t_y = \min(t_x, t_y)$$

It is the most general rule of composition.

An extension of the idea of rectangular membership function and composition of conventional type membership functions to (n+1)-dimensional input system can be carried out as follows.

The extension is to construct an rectangular equi-grade contour plane. The resulting rectangular membership functions and the composition rules for rhombic, V-like shape, rectangle and box-like shape cases are as follows:

① Rhombic case
(n+1)-dimensional Membership function:

$$t = \exp\left[-\left(\sum_{i=1}^{n} \frac{||x_i| - d_i|}{a_i} - s\right)^2\right]$$

where $0<s<s_k$, s.t. $s_k = \min(R_i/a_i)$,
$d_i = R_i - a_i s$.
If $|x|<d_i$, then calculation is done by setting xi=di. In the case that the value of the parentheses is positive, the input point exists at the outside of the contour plane of grade 1. In the negative case or $|x_i|<d_i$ for all "i", the point exists at the inside of that plane.
Composition rule:

$$\diamond t_i = \exp[-(\Sigma|s \pm \sqrt{-\ln t_i}| - s)^2]$$

where $0<s<s_k$, s.t. $s_k = \min(R_i/a_i)$,
$d_i = R_i - a_i s$.
If $|x|<d_i$, then calculation is done by setting ti=(ti)x-i=ai. In the case that the value of the braces is positive, the composition point is laying at the outside. In the negative case or $|x_i|<d_i$ for all "i", the point is laying at the inside of that plane.

② V-like shape case
Membership function:

$$t = \exp\left[-\left(\sum_{i=1}^{n-1} \frac{||x_i| - d_i|}{a_i} - \frac{x_n + d_n}{a_n} - s\right)^2\right]$$

where $0<s<s_k$, s.t. $s_k = \min(R_i/a_i)$,
$d_i = R_i - a_i s$.
If $|x|<d_i$, then calculation is done by setting xi=di. In the case that the value of the parentheses is positive, the input point exists at the outside of the contour plane of grade 1.
In the negative case or $|x_i|<d_i$ for all "i", the point exists at the inside of that plane.
Composition rule:
(i) For $x_n<0$, $$t_i = \exp[-\{\Sigma|s \pm \sqrt{-\ln t_i}| + (s \pm \sqrt{-\ln t_n}) - s\}^2]$$

(ii) For $x_n>0$, $$t_i = \exp[-\{\Sigma|s \pm \sqrt{-\ln t_x}| - (s \pm \sqrt{-\ln t_y}) - s\}^2]$$

where $0<s<s_k$, s.t. $s_k = \min(R_i/a_i)$,
$d_i = R_i - a_i s$.
If $|x|<d_i$, then calculation is done by setting ti=(ti)x-i=ai. In the case that the value of the braces is positive, the composition point is laying at the outside. In the negative case or $|x_i|<d_i$ for all "i", the point is laying at the inside of that plane.

③ Rectangle shape case
Membership function:

$$t = \exp[-(|x_i| - R_i)^2/a_i^2]$$

$(||x_i|-d_i|/a_i=\max\{||x_k|-d_k|/a_k(k=1,2,\ldots,n)\})$

Composition rule:

$\diamond t_j = \min\{t_i(i=1,2,\ldots n)\}$

④ Box-like shape case
Membership function:

$t = \exp[-(|x_i|-R_i)^2/a_i^2]$ $(||x_i|-d_i|/a_i=\max\{||x_k|-d_k|/a_k(k=1,2,\ldots,n)\}$ or $x_n>0$: $i=1,2,\ldots,n-1)$ $t = \exp[-(|x_n|-R_n)^2/a_n^2]$ $(||x_n|-d_n|/a_n=\max\{||x_k|-d_k|/a_k(k=1,2,\ldots,n)\}$
or $x_n<0$)

Composition rule:

$\diamond t_j = \min\{t_i(i=1,2,\ldots,n)\}$

A composition with respect to the polar coordinate form can be done as the same manner discussed in chapter II. The resulting membership function, in the case of rhombic case, on the 2-dimensional input space is given by the following equations.

$$t = \exp\left[-\left(\frac{||x|-d_x|}{a_x}+\frac{||y|-d_y|}{a_y}-s\right)^2 - \frac{\{\tan^{-1}(y/x)-\psi\}^2}{a_{th}^2}\right]$$

$t_{th} = \exp[-(\theta-\psi)^2/a_{th}^2]$

Figure 26A:
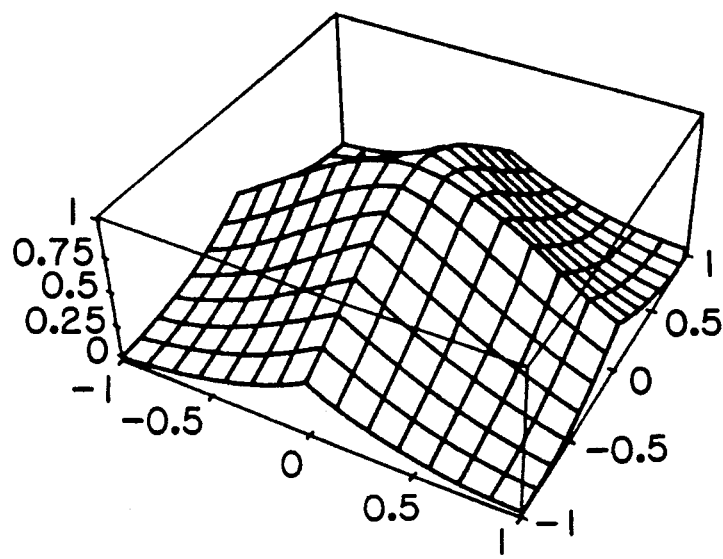
FIGS. 26A and 26B show a bell-like 3-dimensional rhombic membership function.
Figure 26B:
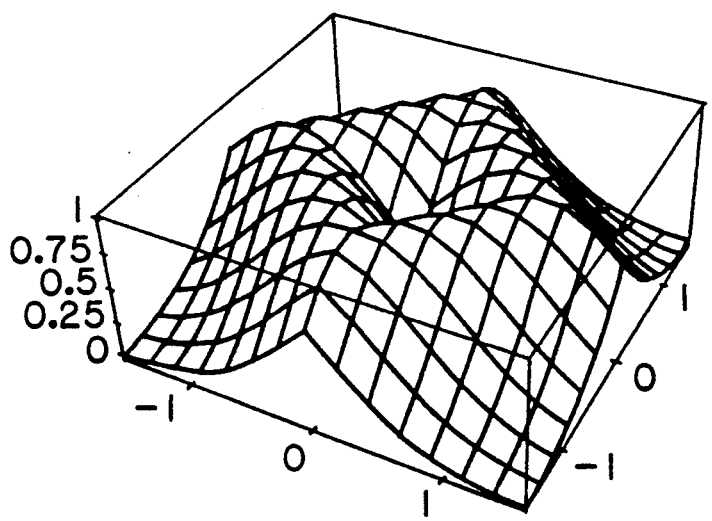

In the case where the rhombus has its center at (A, B) and its axial angle $\psi$, the function becomes as follows.

$$t = \exp\left[-\left(\frac{||X|-d_X|}{a_X}+\frac{||Y|-d_Y|}{a_Y}-s\right)^2 - \frac{\{\tan^{-1}(Y/X)-\psi'\}^2}{a_{th}^2}\right]$$

where, $X = (x-A)\cos\phi + (y-B)\sin\phi$ $Y = -(x-A)\sin\phi + (y-B)\cos\phi$ $\psi' = \psi - \phi$ For example, as the most simple case, if $Rx=Ry=0$, $s=0$, $\psi=0$ and $t_{th}=1$, then the function is $t = \exp[-\{(|x|/a_x)+(|y|/a_y)\}^2]$ FIG. 26A is a graph of the bell-like shape membership function given by above equation. FIG. 26B shows the case when "s" is not equal to 0.
In this case, the composition rule is $t_x \diamond t_y = \exp[-(\sqrt{-\ln t_x} + \sqrt{-\ln t_y})^2]$ Similarly, the most simple shape in n-dimensional input case is given by the following membership function or the composition rule.

$t = \exp[-\{\Sigma(|x_i|/a_i)\}^2]$ $\diamond t_i = \exp[-(\Sigma\sqrt{-\ln t_i})^2]$ (4.2) Triangular shape membership function
FIG. 21 shows the membership function with rhombic equi-grade contour line in the 3-dimensional space which consists of x-y orthogonal axis and degree of compatibility. Notations used in the figure are as follows.

For the simplicity, the fiducial point for constructing membership function is located at the origin of the coordinate system.

F(x,y,rx,ry): a function which gives the rhombic shape of equi-grade contour line
tx=f(x): a triangular shape membership function in x-tx plane
ty=g(y): a triangular shape membership function in y-ty plane
Rx: x-directional distance of rhombic equi-grade contour line at grade 1
Ry: y-directional distance of rhombic equi-grade contour line at grade 1
ax: a parameter of f(x) which is proportional to fuzzy entropy with respect to x
ay: a parameter of g(y) which is proportional to fuzzy entropy with respect to y
rx: a distance between equi-grade contour line of grade 1 and that of arbitrary grade on x-tx plane
ry: a distance between equi-grade contour line of grade 1 and that of arbitrary grade on y-ty plane
t: grade of compatability of point (x,y) with respect to the desired membership function According to the above notations, a equi-grade contour line including some point (x,y) is expressed as follows.

$$\frac{|x|}{R_x+r_x} + \frac{|y|}{R_y+r_y} - 1 = 0$$

The membership functions f(x) and g(y) are $t_x = f(x) = 0 \vee 1 + \frac{R_x \mp x}{a_x}$ $t_y = g(y) = 0 \vee 1 + \frac{R_y \mp y}{a_y}$ where the double signs are "−" for $x>0$ and $y>0$, and are "+" for $x<0$ and $y<0$. The symbol "V" is a max-operator.

A distance between an arbitrary equi-grade contour line and the fiducial point on x-tx plane is $R_x+r_x$, and that on y-ty plane is $R_y+r_y$. That is, $$t = 1 + \frac{R_x \mp \{\pm(R_x + r_x)\}}{a_x} = 1 - \frac{r_x}{a_x}$$

$$\therefore r_x = a_x(1 - t)$$

and $$t = 1 + \frac{R_y \mp \{\pm(R_y + r_y)\}}{a_y} = 1 - \frac{r_y}{a_y}$$

$$\therefore r_y = a_y(1 - t)$$

Then, from these equations, followings must be satisfied.

$$\frac{|x|}{R_x + a_x(1 - t)} + \frac{|y|}{R_y + a_y(1 - t)} - 1 = 0$$

$$\therefore \frac{|x|/a_x}{R_x/a_x + (1 - t)} + \frac{|y|/a_y}{R_y/a_y + (1 - t)} - 1 = 0$$

To make the last equation reform to the explicit function of "t", denominators of the first and the second term must be the same. At first we obtain minimum value $s_k$ as follows.

$$\min(R_x/a_x, R_y/a_y) = s_k$$

Then for arbitrary values such that $0 < s < s_k$, dx and dy are calculated to satisfy $$\frac{R_x - d_x}{a_x} = \frac{R_y - d_y}{a_y} = s$$

That is, obtaining dx and dy by following equations.

$$d_x = R_x - a_x s$$

$$d_y = R_y - a_y s$$

the function of equi-grade line is reformed as follows, $$\frac{|x \mp d_x|/a_x}{(R_x - d_x)/a_x + (1 - t)} + \frac{|y \mp d_y|/a_y}{(R_y - d_y)/a_y + (1 - t)} - 1 = 0$$

Therefore, $$\frac{||x| - d_x|/a_x}{s + (1 - t)} + \frac{||y| - d_y|/a_y}{s + (1 - t)} - 1 = 0$$

holds.

The geometrical meaning of the last equation is illustratively shown in FIG. 22. That is, the equi-grade contour line given by the equation has the rhombic shape with some straight line added. From the last equation we get $$s + (1 - t) = \frac{||x| - d_x|}{a_x} + \frac{||y| - d_y|}{a_y}$$

$$\therefore t = 1 - \left( \frac{||x| - d_x|}{a_x} + \frac{||y| - d_y|}{a_y} - s \right) \vee 0$$

In the calculation of "t" we set $x = d_x$ for $|x| < d_x$ and $y = d_y$ for $|y| < d_y$. In the case that the chosen equi-grade contour line exists at the outside of that of grade 1, as shown in FIG. 21, the value of parentheses of the equation is positive.

By doing same reformation, the following equation is derived in the case that such contour line exists at the inside of that of grade 1.

$$t = 1 + \left( \frac{||x| - d_x|}{a_x} + \frac{||y| - d_y|}{a_y} - s \right) \vee 0$$

In that case, the value of parentheses is positive for the point (x, y) laying on the straight part of contour line, and is negative for the point laying on the rhombic part.

Therefore, for both inside and outside cases, "t" is expressed only by the following equation.

$$t = 1 - \left| \frac{||x| - d_x|}{a_x} + \frac{||y| - d_y|}{a_y} - s \right| \vee 0$$

When the inside (outside) region of the contour line of grade 1 is uniformly grade 1, the value of t is determined according to the above conditions.

When the desired membership function has a V-like shape equi-grade contour line shown in FIG. 23, it is given by the following equation.

$$t = 1 - \left| \frac{||x| - d_x|}{a_x} - \frac{y + d_y}{a_y} - s \right|$$

Moreover, a membership function of rectangle contour line shown in FIG. 24 is $$t = 1 - ||x| - R_x|/a_x$$

$$(||y| - d_y|/a_y < ||x| - d_x|/a_x)$$

$$t = 1 - ||y| - R_y|/a_y$$

$$(||y| - d_y|/a_y > ||x| - d_x|/a_x)$$

and that of box-like contour line shown in FIG. 25 is $$t = 1 - ||x| - R_x|/a_x$$

$$(||y| - d_y|/a_y < ||x| - d_x|/a_x \text{ or } y > 0)$$

$$t = 1 - |y - R_y|/a_y$$

$$(||y| - d_y|/a_y > ||x| - d_x|/a_x \text{ and } y < 0)$$

These expressions are the same as the ordinary ones.

By using the same manner as (4.1), we can compose conventional type membership functions on the rhombic equi-grade contour line. The method is as follows.

In the region outside the contour line of grade 1, the grade of compatibility of x and that of y are given by the following equations, respectively.

$$t_x = 1 + \frac{R_x \mp x}{a_x} = 1 \mp \frac{(R_x - d_x) \mp (x + d_x)}{a_x} =$$

$$1 + s - \frac{|x| - d_x}{a_x}$$

-continued $$\therefore s + (1 - t_x) = \frac{|x| - d_x}{a_x}$$

$$t_y = 1 + \frac{R_y \mp y}{a_y} = 1 + \frac{(R_y - d_y) \mp (y + d_y)}{a_y} =$$

$$1 + s - \frac{|y| - d_y}{a_y}$$

$$\therefore s + (1 - t_y) = \frac{|y| - d_y}{a_y}$$

For the region inside the contour line of grade 1, we can get the following equations.

$$s - (1 - t_x) = \frac{|x| - d_x}{a_x}$$

$$s - (1 - t_y) = \frac{|y| - d_y}{a_y}$$

From these equations the desired composition operation is defined as follows.

$$t_x \diamondsuit t_y = 1 - ||s \pm (1-t_x)| + |s \pm (1-t_y)| - s|$$

Where the double sign is interpreted as same as above. Calculation is done by setting $tx=(tx)x=ax$ for $|x|<dx$ and $ty=(ty)y=ay$ for $|y|<dy$.

The value of the parentheses is positive when composition is done at the outside of the rhombic contour line of grade 1. In the case that composition is done at the inside of that line, the value of the parentheses is positive for the straight line part and is negative for rhombic part.

In the region of $|x|<Rx$ and $|y|<Ry$ (or $|x|>Rx$ and $|y|>Ry$), the composed value is determined according to the above conditions, when tx and ty are uniformly grade 1 in that region. That is, in the region of grade 1, the grade of x and that of y are similarly composed by assuming that the respective membership functions exist.

By the composition rule constructed above, a set of conventional type membership functions has the same effect as a membership function with rhombic shape. Therefore, the information processing apparatus for the conventional type membership functions can be used to incorporate a fuzzy set with rhombic shape of boundary by the composition rule.

When the conventional type membership functions are composed on V-like shape equi-grade contour line, the composition rule is given as follows.

(i) For $y<0$, $$t_x \diamondsuit t_y = 1 - ||s \pm (1-t_x)| + |s \pm (1-t_y)| - s|$$

(ii) For $y>0$, $$t_x \diamondsuit t_y = 1 - ||s \pm (1-t_x)| - |s \pm (1-t_y)| - s|$$

where the double signs are the same as above.

Moreover, when they are composed on rectangle contour line or box-like contour line, the rule is $$t_x \diamondsuit t_y = \min(t_x, t_y)$$

It is the most general rule of composition.

An extension of the idea of rectangular membership function and composition of conventional type membership functions to n-dimensional input system can be carried out as follows.

The extension is to construct an rectangular equi-grade contour plane. The resulting rectangular membership functions and the composition rules for rhombic, V-like shape, rectangle and box-like shape cases are as follows.

① Rhombic case
Membership function:

$$t = 1 - \left| \sum_{i=1}^{n} \frac{||x_i| - d_i|}{a_i} - s \right| \vee 0$$

where $0<s<s_k$, s.t. $s_k=\min(Ri/ai)$,
$di=Ri-ais$.

If $|x|<di$, then calculation is done by setting $xi=di$. In the case that the value of the formula in the absolute value symbol is positive, the input point exists at the outside of the contour plane of grade 1. In the negative case or $|xi|<di$ for all "i", the point exists at the inside of that plane.

Composition rule:

$$\diamondsuit t_i = 1 - |\Sigma|s \pm (1-t_i)| - s|$$

where $0<s<s_k$, s.t. $s_k=\min(Ri/ai)$,
$di=Ri-ais$.

If $|x|<di$, then calculation is done by setting $ti=(ti)x-i=ai$. In the case that the value of the formula in the absolute value symbol braces is positive, the composition point is laying at the outside. In the negative case or $|xi|<di$ for all "i", the point is laying at the inside of that plane.

② V-like shape case
Membership function:

$$t = 1 - \left| \sum_{i=1}^{n-1} \frac{||x_i| - d_i|}{a_i} - \frac{x_n + d_n}{a_n} - s \right| \vee 0$$

where $0<s<s_k$, s.t. $s_k=\min(Ri/ai)$,
$di=Ri-ais$.

If $|x|<di$, then calculation is done by setting $xi=di$. In the case that the value of the formula in the absolute value symbol is positive, the input point exists at the outside of the contour plane of grade 1. In the negative case or $|xi|<di$ for all "i", the point exists at the inside of that plane.

Composition rule:
(i) For $x_n<0$, $$\diamondsuit t_i = 1 - |\Sigma|s \pm (1-t_i)| + \{s \pm (1-t_n)\} - s|$$

(ii) For $x_n>0$, $$\diamondsuit t_i = 1 - |\Sigma|s \pm (1-t_i)| - \{s \pm (1-t_n)\} - s|$$

where $0<s<s_k$, s.t. $s_k=\min(Ri/ai)$,
$di=Ri-ais$.

If $|x|<di$, then calculation is done by setting $ti=(ti)x-i=ai$. In the case that the value of the formula in the absolute value symbol is positive, the composition point is laying at the outside. In the negative case or $|xi|<di$ for all "i", the point is laying at the inside of that plane.

③ Rectangle shape case
Membership function:

$t = 1 - ||x_i| - R_i|/a_i$ $(||x_i| - d_i|/a_i = \max\{||x_k| - d_k|/a_k (k=1,2,\ldots,n)\}$ Composition rule:

$\diamond t_j = \min\{t_i (i=1,2,\ldots,n)\}$

④ Box-like shape case $t = 1 - ||x_i| - R_i|/a_i$ $(||x_i| - d_i|/a_i = \max\{||x_k| - d_k|/a_k (k=1,2,\ldots,n)\}$
or $x_n > 0$: $i = 1,2,\ldots,n-1$)

$t = 1 - |x_n + R_n|/a_n$ $(||x_n| - d_n|/a_n = \max\{||x_k| - d_k|/a_k (k=1,2,\ldots,n)\}$ or $x_n < 0$)

Composition rule:

$\diamond t_j = \min\{t_i (i=1,2,\ldots,n)\}$

A composition with respect to the polar coordinate form can be done as the same manner discussed in chapter II. The resulting membership function, in the case of rhombic case, on the 3-dimensional input space is given by the following equations.

$t = 1 -$ $$\sqrt{\left(\frac{||x| - d_x|}{a_x} + \frac{||y| - d_y|}{a_y} - s\right)^2 + \frac{\{\tan^{-1}(y/x) - \psi\}^2}{a_{th}^2}}$$

$t_{th} = 1 - \{|\theta - \psi|/a_{th}\}$

Figure 27A:
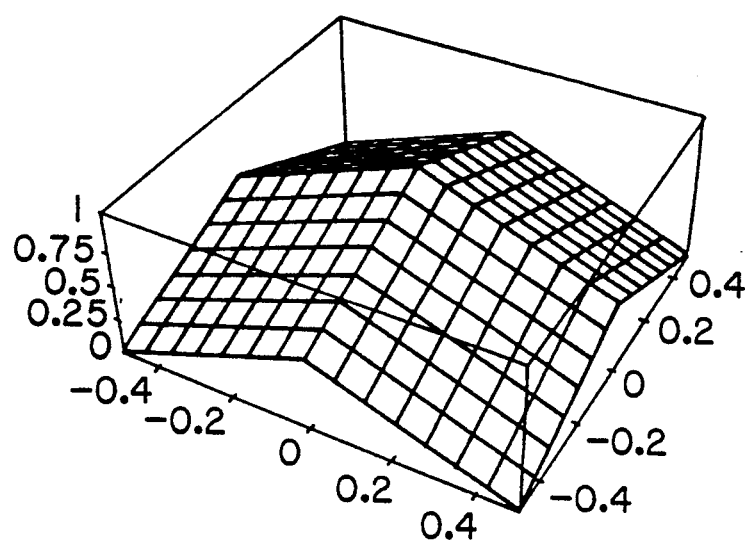
FIGS. 27A and 27B show shapes of 3-dimensional triangular membership function having a rhombic equi-grade contour line.
Figure 27B:
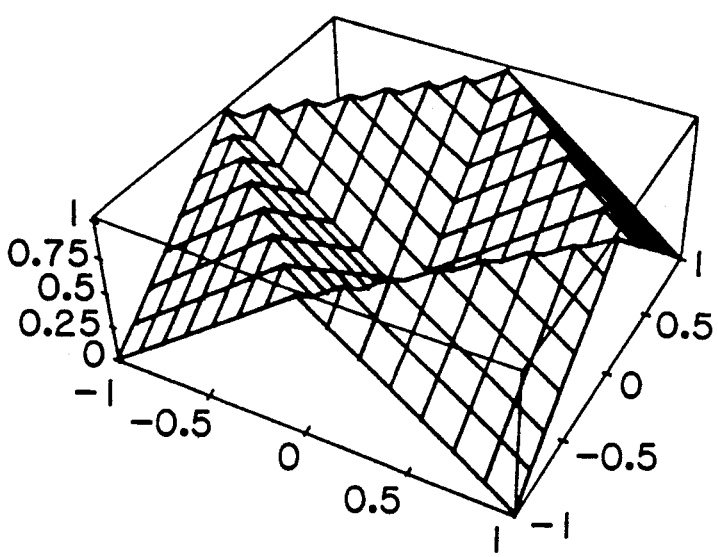

In the case where the rhombus has its center at (A,B) and its axial angle $\psi$, the function becomes as follows.

$$t = 1 - \sqrt{\left(\frac{||X| - d_X|}{a_X} + \frac{||Y| - d_Y|}{a_Y} - s\right)^2 + \frac{\{\tan^{-1}(Y/X) - \psi'\}^2}{a_{th}^2}}$$

where, $X = (x - A) \cos \phi + (y - B) \sin \phi$ $Y = -(x - A) \sin \phi + (y - B) \cos \phi$ $\psi' = \psi - \phi$ For example, as the most simple case, if $Rx = Ry = 0$, $s = 0$, $\psi = 0$ and $t_{th} = 1$, then the function is $t = 1 - |(|x|/a_x) + (|y|/a_y)|$ FIG. 27A is a graph of the triangular shape membership function given by above equation. FIG. 27B shows the case when "s" is not equal to 0.

In this case, the composition rule is $\diamond t_x \quad t_y = 1 - |(1 - t_x) + (1 - t_y)|$ Similarly, the most simple shape in n-dimensional input case is given by the following membership function or the composition rule.

$t = 1 - |\Sigma(|x_i|/a_i)|$ $\diamond t_j = 1 - |\Sigma(1 - t_i)|$

Figure 28:
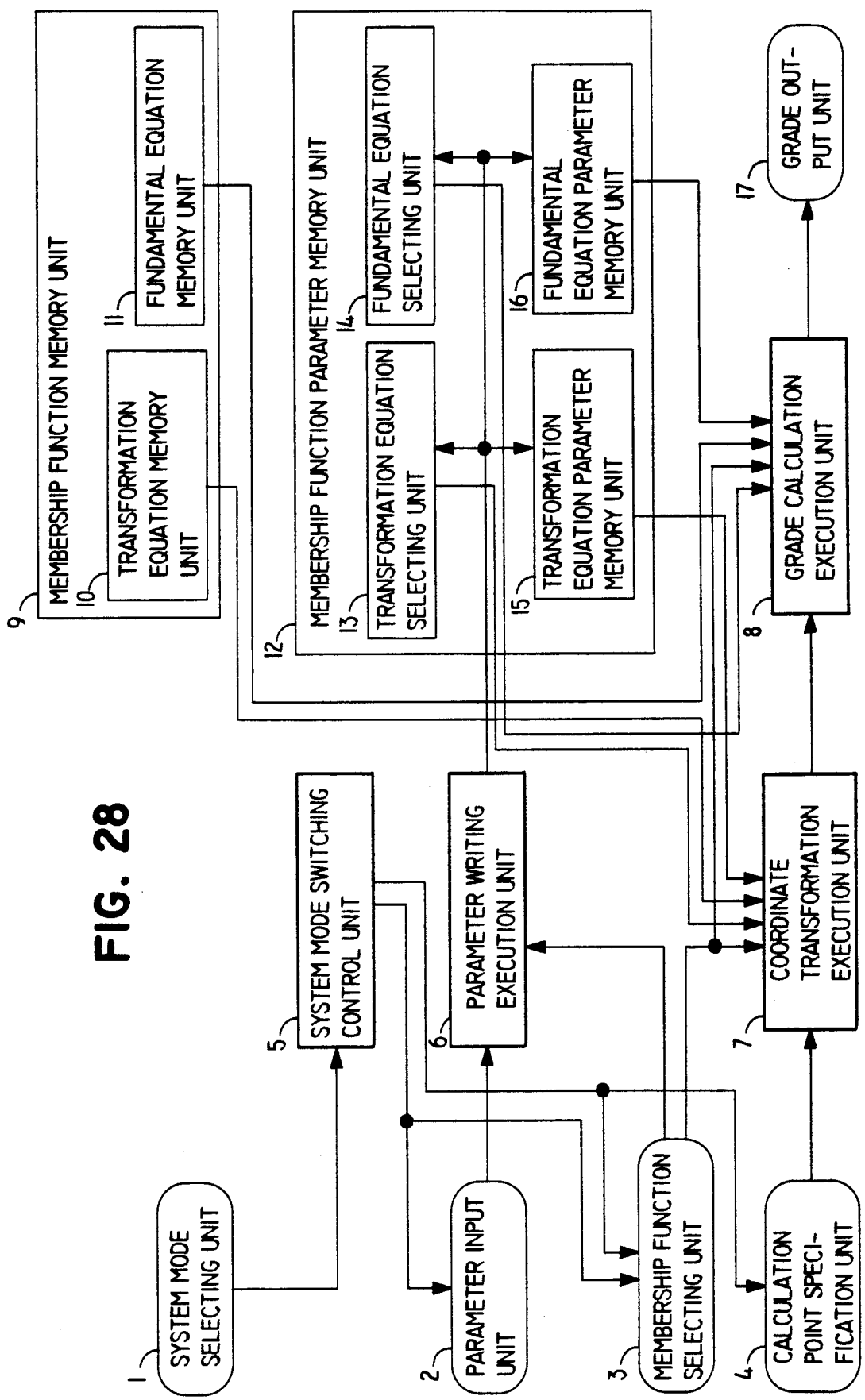
FIG. 28 is a block diagram showing a basic construction of multi-dimensional membership function generating apparatus according to the present invention.

FIG. 28 shows conceptual construction of apparatus which generates the multi-dimensional membership functions according to the present invention. The apparatus consists of the following units:

System Mode Selecting Unit 1:

This unit gives the signal to select one of two system modes, i.e., a mode of calculating the grade of compatibility and a mode of writing or changing parameters for incorporating a membership function, according to the input.

Parameter Input Unit 2:

The value of each parameter for a multi-dimensional membership function can be inputted to the system by this unit.

Membership Function Selecting Unit 3:

In both mode selected by the unit 1, the unit 3 gives the signal for selecting an equation and a set of parameters of the specified membership function out of ones which memorized in units 9 and 12 described later, respectively.

Calculation Point Specification Unit 4:

Position of a point at which grade of compatibility is calculated can be input by this unit.

System Mode Switching Control Unit 5:

This unit controls action of the units 2, 3 and 4 according to the signal from the unit 1. That is, it activates the units 3 and 4 in the calculation mode, or it activates the units 2 and 3 in the parameter writing or changing mode.

Parameter Writing Execution Unit 6:

In the parameter writing mode, the unit 6 executes writing process of each value of parameter input by the unit 2 to the unit 12 for the membership function selected by the unit 3.

Coordinate Transformation Execution Unit 7:

In the calculation mode, the unit 7 executes calculation of the coordinate value of the specified point transformed by parallel displacement, rotation or deformation. The calculation is done through the following process:

At first, according to the signal from the unit 3, a signal for selecting coordinate transformation equation and each value of parameters of the equation are read from units 13 and 15 described later, respectively. Then, by the signal from the unit 13, a coordinate transformation equation is selected out of ones memorized in unit 10. Finally, by using the equation and each value of its parameters, a new coordinate value is calculated for the point whose old coordinate value is input by the unit 4.

Grade Calculation Execution Unit 8:

In the calculation mode, the unit 8 calculates grade of compatibility of the point input by the unit 4 and modified by the unit 7, with respect to the membership function specified by a fundamental equation memorized in unit 11 and a set of values of parameters memorized in unit 16 as described later. The calculation is done through the following process:

At first, according to the signal from the unit 3, a signal for selecting fundamental equation of membership function and each value of parameters of the equation are read from the units 14 and 16 described later, respectively. Then by the signal from the unit 14, a fundamental equation is selected out of ones memorized in the unit 1. Finally, by using the equation and each value of its parameters, a grade of compatibility is calculated at the point inputted by the unit 4 and modified by the unit 7.

Membership Function Memory Unit 9:

This unit memorizes equations for multi-dimensional membership functions. It consists of a Transformation Equation Memory Unit 10 and a Fundamental Equation Memory Unit 11.

Transformation Equation Memory Unit 10:

This unit memorizes coordinate transformation equations for parallel displacement, rotation and deformation of multi-dimensional membership function.

Fundamental Equation Memory Unit 11:

This unit memorizes fundamental equations for calculating the grade of compatibility with respect to the multi-dimensional membership function.

Membership Function Parameter Memory Unit 12:

This unit memorizes the individual multi-dimensional membership functions and the values of their parameters, which are used in the fuzzy information processing system including the invention. It consists of a Transformation Equation Selecting Unit 13, a Fundamental Equation Selecting Unit 14, a Transformation Equation Parameter Memory Unit 15 and a Fundamental Equation Parameter Memory Unit 16.

Transformation Equation Selecting Unit 13:

This unit memorizes the selection signal for coordinate transformation equation in the unit 10. The selection signal is specified by the multi-dimensional membership function corresponding to the signal from the unit 3.

Fundamental Equation Selecting Unit 14:

This unit memorizes the selection signal for fundamental equation in the unit 11. The selection signal is specified by the multi-dimensional membership function corresponding to the signal from the unit 3.

Transformation Equation Parameter Memory Unit 15:

This unit memorizes the values of parameters of a specific coordinate transformation equation which is applied to the multi-dimensional membership function corresponding to the signal from the unit 3.

Fundamental Equation Parameter Memory Unit 16:

This unit memorizes the values of parameters of a specific &undamental equation which is used by the multi-dimensional membership function corresponding to the signal from the unit 3.

Grade Output Unit 17:

This unit outputs the resulting grade of compatibility calculated by the unit 8.

Figure 29:
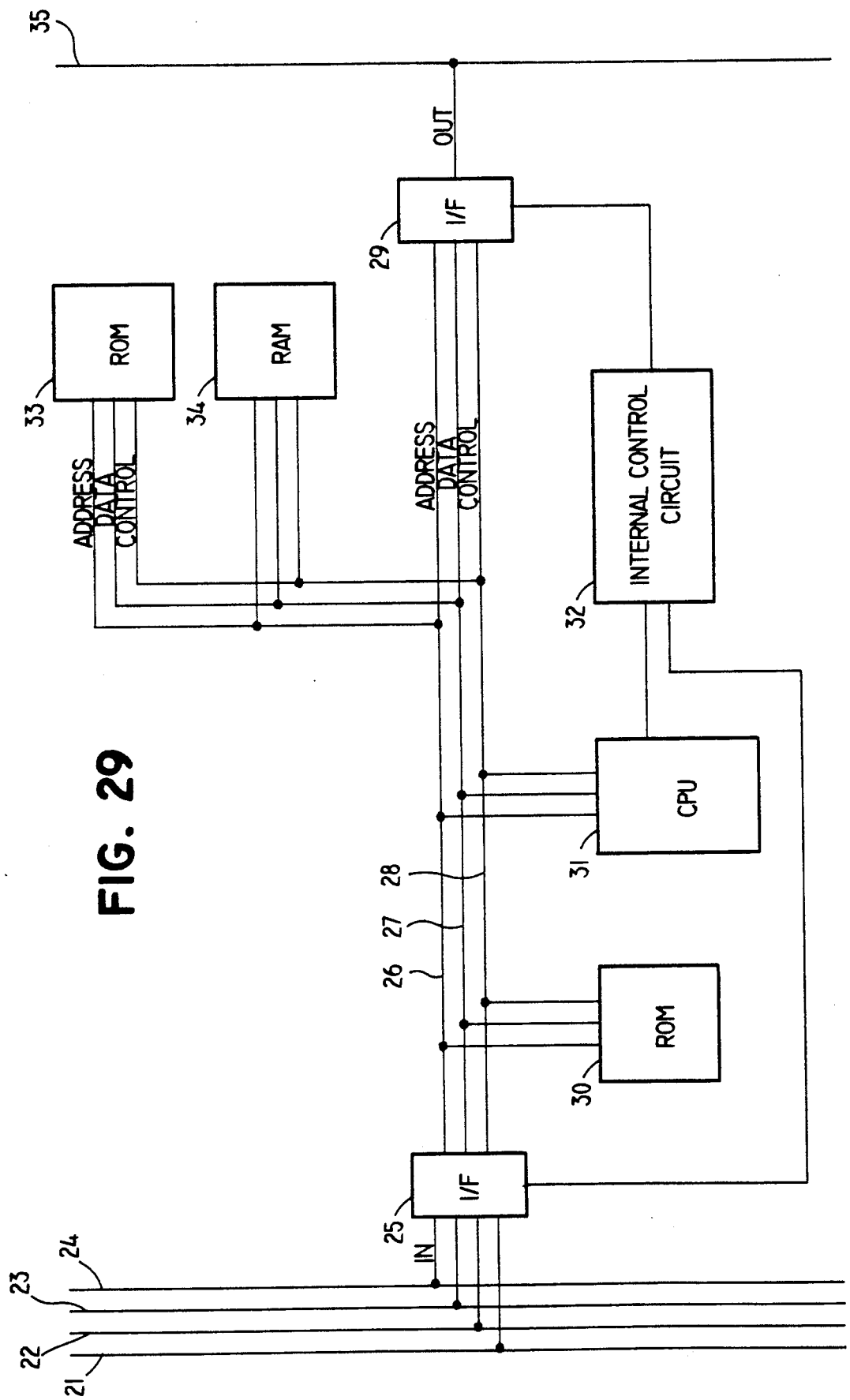
FIG. 29 shows a computer for executing operation of the apparatus of FIG. 28.

The above apparatus for generating multi-dimensional membership function can be, for example, implemented by the computer system shown in FIG. 29.

Signal lines 21-24 are provided for transmitting mode selecting signal, values of parameters, multi-dimensional membership function selecting signal and coordinate values of a specific point, respectively. They are connected to an input interface 25.

The input interface 25 is constructed by a communication interface circuit which connects signal lines 21-24 to the multi-dimensional membership function generator shown in FIG. 28. The input interface 25 realizes the units 1-4.

From the input interface 25, three signal lines 26, 27 and 28 are extended to connect an output interface 29, and these lines are also connected to ROM 30, CPU 31, ROM 33 and RAM 34. An internal control circuit 32 is connected to the interfaces 25, 29 and CPU 31.

The ROM 30, CPU 31 and internal control circuit 32 realize the actions of units 5, 6, 7 and 8 in FIG. 28.

The ROM 30 is a kind of write protected memory which memorizes the programs implementing the actions of units 5, 6, 7 and 8.

The CPU 31 is a processing unit which realizes the actions of units 5, 6, 7 and 8 according to the program stored in the ROM 30.

The internal control circuit 32 controls timing of above actions.

The ROM 33 is a kind of write protected memory which memorizes equations used for constructing multi-dimensional membership function. It corresponds to the unit 9.

The RAM 34 memorizes the values of parameters for the multi-dimensional membership function. It corresponds to the unit 12.

The output interface 29 is constructed by a communication interface circuit which connects the multi-dimensional membership function generator to an output signal line 35. It realizes the unit 17.

The output signal line 35 transmits the output signal of the above generator, that is, the grade of compatibility with respect to a multi-dimensional membership function.

By using the realization mentioned above, an n-dimensional membership function can be incorporated at every position on the space of input variables ($x_1$, $x_2$, ..., $x_n$), whose equi-grade contour line is elliptic, parabolic or rectangular. A grade of compatibility of input value with respect to the membership function can be calculated.

According to the present invention, a multi-dimensional membership function with an arbitrary shape of its boundary can be incorporated and can easily be moved to everywhere in the input space by changing the parameters of membership function. Therefore, the present invention fairly increases the applicability of fuzzy information processing.

What is claimed is:

1. An apparatus for generating multi-dimensional membership functions comprising:

a membership function memory for storing equations for multi-dimensional membership functions;

a membership function parameter memory for storing the individual multi-dimensional membership functions and the value of parameters of said multi-dimensional membership functions;

a mode selector for selecting one of two modes, one of said modes being a writing execution mode for loading the value of parameters into said membership function parameter memory and the other of said modes being a calculation mode for calculating a grade of membership;

a parameter input for entering the value of parameters for the multi-dimensional membership functions when said writing execution mode is selected by said mode selector;

a membership function selector for selecting a multi-dimensional membership function defining the values of parameters for equations stored in said membership function memory in said writing execution mode, and to select values of parameters stored in said membership function parameter memory for equations stored in said membership function memory in said calculation mode;

a parameter writing execution controller to write the value of parameters from said parameter input to said membership function parameter memory for a selected multi-dimensional membership function;

a mode controller for controlling said parameter input, said membership function selector and said parameter writing execution controller in response to an output from said mode selector, such that said mode controller activates said parameter input, said membership function selector and said parameter writing execution controller in said writing execution mode and said mode controller activates said membership function selector in said calculation mode;

a coordinate transformation calculator for determining transformed parameters for said selected multi-dimensional membership function by a transformation selected from the group consisting of parallel displacement, rotation, deformation and combinations of said transformations;

a grade calculator for calculating the grade of membership for said selected multi-dimensional membership function, using said transformed parameters from said coordinate transformation calculator; and an output means for generating an output representing the grade of membership calculated by said grade calculator.

2. An apparatus according to claim 1, wherein said membership function memory comprises:

a transformation equation memory for storing coordinate transformation equations for parallel displacement, rotation and deformation of the multi-dimensional membership function; and a fundamental equation memory for storing fundamental equations for calculating the grade of compatibility with respect to the multi-dimensional membership function.

3. An apparatus according to claim 2, wherein said membership function parameter memory comprises:

a transformation equation selecting memory for storing the selection signal specified by the multi-dimensional membership function corresponding to the signal from said membership function selecting means for the coordinate transformation equation stored in said transformation equation memory;

a fundamental equation selecting memory for storing the selection signal specified by the multi-dimensional membership function corresponding to the signal from said membership function selecting means for the fundamental equation stored in said fundamental equation memory;

a transformation equation parameter memory for storing the values of parameters of a specific coordinate transformation equation which is applied to the multi-dimensional membership function corresponding to the signal form said membership function selecting means; and a fundamental equation parameter memory for storing the values of parameters of a fundamental equation which is used by the multi-dimensional membership function corresponding to the signal from said membership function selecting means.

4. An apparatus according to claim 3, wherein said coordinate transformation execution means reads out a signal for selecting coordinate transformation equation and each value of parameters of the equation from said transformation equation selecting memory and said transformation equation parameter memory respectively, according to the signal from said membership function selecting means, and executes calculation of coordinate values of the specified point for the coordinate values inputted by said calculation point specification means by using a coordinate transformation equation selected from said transformation equation memory according to said signal for selecting coordinate transformation equation and said value of parameters.

5. An apparatus according to claim 4, wherein said grade calculation execution means reads out a signal for selecting fundamental equation and each value of parameters of the equation from said fundamental equation selecting memory and said fundamental equation parameter memory respectively, according to the signal from said membership function selecting means in the calculation mode, and executes calculation of grade of compatibility of the point inputted by said calculation point specification means and modified by said coordinate transformation execution means by using a fundamental equation selected from said fundamental equation memory according to said signal for selecting fundamental equation and said value of parameters.

* * * * *